US012779666B2

(12) United States Patent
Johnson et al.

(10) Patent No.: US 12,779,666 B2
(45) Date of Patent: Nov. 3, 2026

(54) ROBOTICS CORNER MODULE

(71) Applicant: Schaeffler Technologies AG & Co. KG, Herzogenaurach (DE)

(72) Inventors: Joseph Johnson, Mooresville, NC (US); Craig Hooker, Indian Land, SC (US); Nicholas Hrusch, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 268 days.

(21) Appl. No.: 18/756,541

(22) Filed: Jun. 27, 2024

(65) Prior Publication Data

US 2025/0083305 A1 Mar. 13, 2025

Related U.S. Application Data

(63) Continuation-in-part of application No. 18/402,791, filed on Jan. 3, 2024.

(Continued)

(51) Int. Cl.

*B25J 9/10* (2006.01)
*B25J 9/00* (2006.01)

(Continued)

(52) U.S. Cl.

CPC ............ *B25J 9/102* (2013.01); *B25J 9/0009* (2013.01); *B25J 9/08* (2013.01); *B25J 19/0054* (2013.01)

(58) Field of Classification Search

CPC ..... B25J 5/007; B25J 9/162; B25J 9/08; B25J 19/0025; B25J 9/126; B25J 17/0258;

(Continued)

(56) References Cited

U.S. PATENT DOCUMENTS 6,731,091 B2 5/2004 Hietmann et al.
8,024,936 B2 9/2011 Storm et al.

(Continued)

FOREIGN PATENT DOCUMENTS

JP 4563703 B2 10/2010

OTHER PUBLICATIONS

Swerve Drive Specialties, "MK4 Swerve Module," on-line sales listing, http://www.swervedrivespecialties.com/products/mk4-swerve-module, accessed on Jun. 26, 2024, 9 pages, published 2024.

(Continued)

*Primary Examiner* — Said Bouziane
(74) *Attorney, Agent, or Firm* — Price Heneveld LLP

(57) ABSTRACT

A robotics corner module includes a steering drive unit, a traction drive unit, and a support structure. The steering drive unit includes an electric motor that drives rotation of a rotor shaft about a rotor shaft axis, and an output shaft coupled with the rotor shaft via a geartrain, such that rotation of the rotor shaft about the rotor shaft axis by the electric motor drives rotation of the output shaft about an output shaft axis that is parallel to and radially offset from the rotor shaft axis. The traction drive unit includes an electric motor that drives rotation of a rotor shaft about a rotor shaft axis, and a wheel hub operably coupled with the rotor shaft of the traction drive unit via a geartrain.

19 Claims, 16 Drawing Sheets

Related U.S. Application Data

(60) Provisional application No. 63/537,490, filed on Sep. 9, 2023.

(51) Int. Cl.
*B25J 9/08* (2006.01)
*B25J 19/00* (2006.01)

(58) Field of Classification Search
CPC .......... B60L 1/00; H02K 7/003; H02K 7/116; H02K 21/14; F16H 1/32; F16H 49/001; F16C 32/0406
See application file for complete search history.

(56) References Cited

U.S. PATENT DOCUMENTS

| | | | | |
|---|---|---|---|---|
| 11,836,018 | B2 | 12/2023 | Larsen | |
| 2019/0248233 | A1 | 8/2019 | Calleija et al. | |
| 2020/0114714 | A1* | 4/2020 | Doan | B62D 61/10 |
| 2022/0305672 | A1 | 9/2022 | Meduna et al. | |
| 2023/0303154 | A1 | 9/2023 | Rabson | |

OTHER PUBLICATIONS

Rev Robotics, "3in MAXSwerve Module," on-line sales listing, http://www.revrobotics.com/rev-21-3005/, accessed on Jun. 26, 2024, 5 pages, published 2024.

* cited by examiner

ROBOTICS CORNER MODULE

CROSS-REFERENCE TO RELATED APPLICATIONS

This application is a continuation-in-part application of U.S. patent application Ser. No. 18/402,791, filed Jan. 3, 2024, and entitled STEERING GEARBOX FOR ROBOTICS CORNER MODULE, which claims the benefit of U.S. Provisional Patent Application No. 63/537,490, filed Sep. 9, 2023. This application further relates to U.S. patent application Ser. No. 18/756,507, filed Jun. 27, 2024, and entitled ROBOTICS CORNER MODULE. The contents of the foregoing applications are relied upon and incorporated herein by reference in their entirety.

FIELD OF THE DISCLOSURE

The present disclosure generally relates to robotics corner modules. More specifically, the present disclosure relates to a robotics corner module that includes a steering drive unit, a traction drive unit, and an intermediate assembly extending therebetween for a robot.

BACKGROUND OF THE DISCLOSURE

Robots often include steerable wheels that are synchronized to allow for precise movement.

SUMMARY OF THE DISCLOSURE

According to a first aspect of the present disclosure, a robotics corner module includes a steering drive unit, a traction drive unit, and a support structure. The steering drive unit includes an electric motor that drives rotation of a rotor shaft about a rotor shaft axis, and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis. The traction drive unit includes an electric motor that drives rotation of a rotor shaft about a rotor shaft axis, and a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit. The support structure extends between the output shaft and the traction drive unit, such that rotation of the output shaft about the output shaft axis drives rotation of the support structure and the traction drive unit about the output shaft axis.

Embodiments of the first aspect of the disclosure can include any one or a combination of the following features:

- the geartrain of the traction drive unit includes a first planetary gearset including a sun gear that coupled to the rotor shaft of the traction drive unit, such that the sun gear and the rotor shaft of the traction drive unit are operable to rotate about the rotor shaft axis of the traction drive unit at a common rate of rotation, a plurality of planet gears engaged with the sun gear and configured to revolve about the rotor shaft axis of the traction drive unit, and a carrier that rotates about the rotor shaft axis of the traction drive unit at a rate corresponding with a rate that the planet gears revolve about the rotor shaft axis of the traction drive unit;

- the geartrain of the traction drive unit includes a second planetary gearset includes a sun gear that is coupled to the carrier of the first planetary gearset and configured to rotate at a common rate of rotation about the rotor shaft axis of the traction drive unit with the carrier of the first planetary gearset, a plurality of planet gears engaged with the sun gear of the second planetary gearset and configured to revolve about the rotor shaft axis of the traction drive unit, and a carrier that rotates about the rotor shaft axis of the traction drive unit at a rate corresponding with a rate that the planet gears of the second planetary gearset revolve about the rotor shaft axis of the traction drive unit, wherein the carrier of the second planetary gearset is operably coupled with the wheel hub, such that the wheel hub and the carrier of the second planetary gearset rotate at a common rate of rotation;
- the geartrain of the traction drive unit includes a ring gear that, with respect to the rotor shaft axis of the traction drive unit, is rotationally fixed and is radially outboard of and engaged with the plurality of planet gears of the first planetary gearset and the plurality of planet gears of the second planetary gearset;
- the carrier of the second planetary gearset includes an axially distal face that faces axially away from the electric motor of the traction drive unit with respect to the rotor shaft axis of the traction drive unit, the axially distal face having a spline interface that is engaged with a corresponding spline interface of the wheel hub that faces axially toward the electric motor of the traction drive unit;
- the traction drive unit further includes a traction drive unit housing that includes a main body that has an inner surface that defines a motor housing region that houses the electric motor of the traction drive unit and an outer surface opposite the inner surface, and a wheel hub bearing that extends radially, with respect to the rotor shaft axis of the traction drive unit, between the outer surface of the main body of the traction drive unit housing and the wheel hub and that is configured to support and facilitate rotation of the wheel hub about the wheel hub axis, wherein the wheel hub bearing is axially aligned with the electric motor of the traction drive unit with respect to the rotor shaft axis of the traction drive unit;
- the traction drive unit further includes a wheel rim that, with reference to the rotor shaft axis of the traction drive unit, extends radially outboard from the wheel hub and is axially aligned with the wheel hub bearing;
- the outer surface of the main body includes a groove that, with respect the rotor shaft axis of the traction drive unit, is recessed in the radially-inboard direction and axially aligned with the electric motor of the traction drive unit;
- a radiator mounted to the support structure and having a conduit extending outward therefrom and into the groove of the outer surface, such that a portion of the conduit is axially aligned with the motor and positioned radially between the wheel hub bearing and the main body, with respect to the rotor shaft axis of the traction drive unit;
- the conduit includes a terminal end that is disposed within the groove of the outer surface of the main body;
- the main body of the traction drive unit housing further defines a gearbox region that houses the geartrain on a first axial side of the motor housing region with respect to the rotor shaft axis of the traction drive unit;

the traction drive unit housing includes a bearing shield that, with respect to the rotor shaft axis of the traction drive unit, extends radially inboard from the inner surface of the main body between the motor housing region and the gearbox region, and a gearbox end plate that, with respect to the rotor shaft axis of the traction drive unit, extends radially inboard from the inner surface of the main body toward the carrier of the second planetary gearset, such that the inner surface of the main body, the bearing shield, and the gearbox end plate cooperate to define the gearbox region of the housing, wherein the carrier of the second planetary gearset extends through a gearbox end plate opening defined by the gearbox end plate, such that the axially distal face of the carrier is positioned axially beyond the gearbox end plate outside of the gearbox region of the housing;

the traction drive unit further includes an electric brake configured to inhibit rotational movement of the rotor shaft about the rotor shaft axis of the traction drive unit;

the traction drive unit housing includes a bearing shield that, with respect to the rotor shaft axis, extends radially inboard from the inner surface of the main body between the motor housing region and an electric brake housing region that is defined by the main body and the bearing shield that extends between the motor housing region and the electric brake housing region, wherein the motor housing region is positioned axially between the gearbox region and the electric brake housing region; and the traction drive unit housing includes a partition that, with respect to the rotor shaft axis, extends radially inboard from the inner surface of the main body, such that the main body, the bearing shield that extends between the motor housing region and the electric brake housing region, and the partition cooperate to define the electric brake housing region, wherein the partition further defines an electronics compartment that houses an in-line driver board for controlling the electric motor of the traction drive unit, the electronics compartment being positioned, such that the electric brake housing region is positioned axially between the electronic compartment and the motor housing region.

According to a second aspect of the present disclosure, a robotics corner module includes a steering drive unit, a traction drive unit, and a support structure. The steering drive unit includes an electric motor that drives rotation of a rotor shaft about a rotor shaft axis, and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis. The traction drive unit includes an electric motor that drives rotation of a rotor shaft about a rotor shaft axis, a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit, a traction drive unit housing that includes a main body that has an inner surface that defines a motor housing region that houses the electric motor of the traction drive unit and an outer surface opposite the inner surface, and a wheel hub bearing that extends radially, with respect to the rotor shaft axis of the traction drive unit, between the outer surface of the main body of the traction drive unit housing and the wheel hub and is configured to support and facilitate rotation of the wheel hub about the wheel hub axis, wherein the wheel hub bearing is axially aligned with the electric motor of the traction drive unit with respect to the rotor shaft axis of the traction drive unit. The support structure extends between the output shaft and the traction drive unit, such that rotation of the output shaft about the output shaft axis drives rotation of the support structure and the traction drive unit about the output shaft axis.

Embodiments of the second aspect of the disclosure can include any one or a combination of the following features:

the traction drive unit further includes a wheel rim that, with reference to the rotor shaft axis of the traction drive unit, extends radially outboard from the wheel hub and is axially aligned with the wheel hub bearing;

the outer surface of the main body includes a groove that, with respect the rotor shaft axis of the traction drive unit, is recessed in the radially-inboard direction and axially aligned with the electric motor of the traction drive unit; and a radiator mounted to the support structure and having a conduit extending outward therefrom and into the groove of the outer surface, such that a portion of the conduit, with respect to the rotor shaft axis of the traction drive unit, is axially aligned with the electric motor of the traction drive unit and positioned radially between the wheel hub bearing and the main body.

According to a third aspect of the present disclosure, a robotics corner module includes a steering drive unit, a traction drive unit, a support structure, and a radiator. The steering drive unit includes an electric motor that drives rotation of a rotor shaft about a rotor shaft axis, and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis. The traction drive unit includes an electric motor that drives rotation of a rotor shaft about a rotor shaft axis, and a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit. The support structure extends between the output shaft and the traction drive unit, such that rotation of the output shaft about the output shaft axis drives rotation of the support structure and the traction drive unit about the output shaft axis. The radiator is mounted to the support structure.

These and other features, advantages, and objects of the present disclosure will be further understood and appreciated by those skilled in the art by reference to the following specification, claims, and appended drawings.

Figure 1:
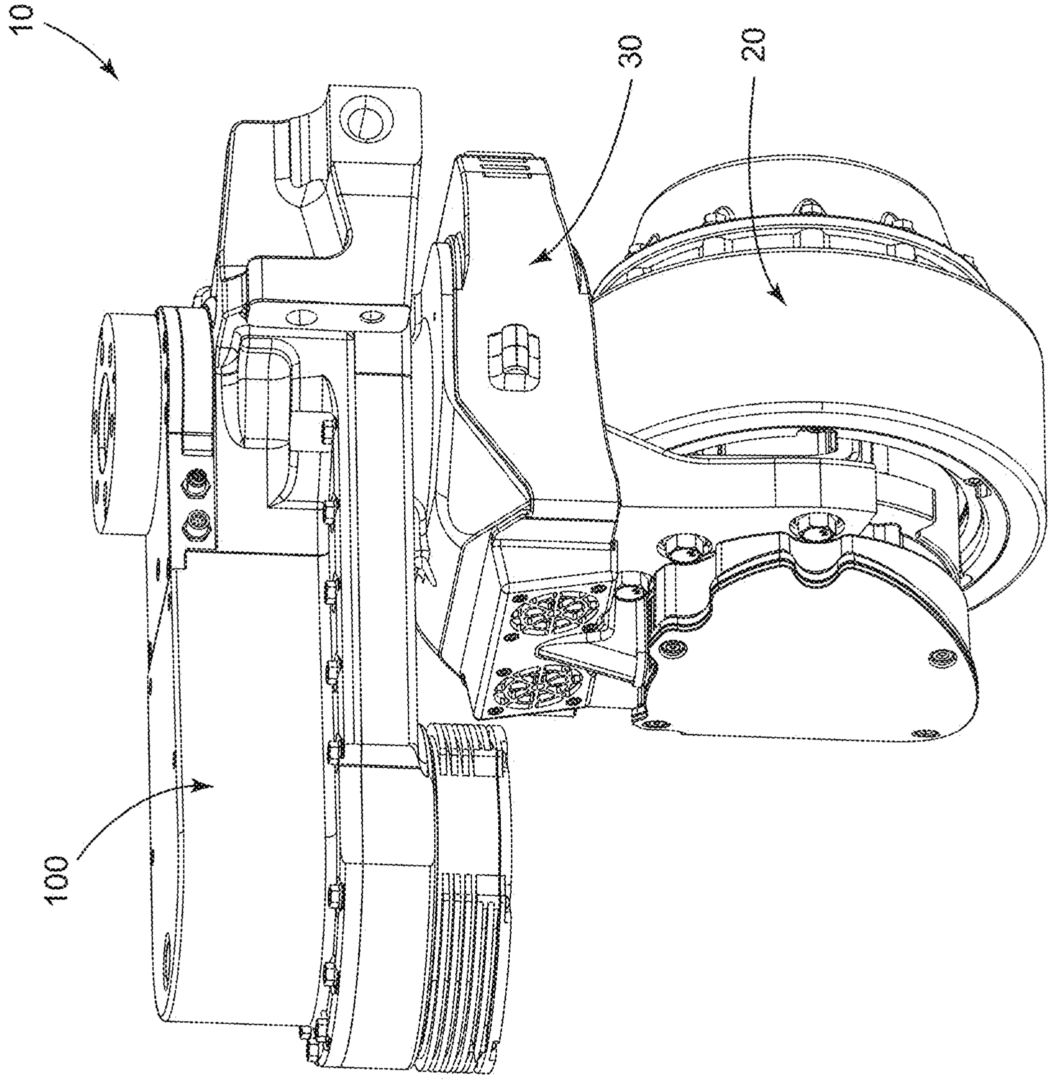
FIG. 1 is a perspective view of a robotics corner module, according to one embodiment.

The components in the figures are not necessarily to scale, emphasis instead being placed upon illustrating the principles described herein.

DETAILED DESCRIPTION

Additional features and advantages of the disclosure will be set forth in the detailed description which follows and will be apparent to those skilled in the art from the description, or recognized by practicing the disclosure as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as "first" and "second," "top" and "bottom," and the like, are used solely to distinguish one entity or action from another entity or action, without necessarily requiring or implying any actual such relationship or order between such entities or actions.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and/or any additional intermediate members. Such joining may include members being integrally formed as a single unitary body with one another (i.e., integrally coupled) or may refer to joining of two components. Such joining may be permanent in nature, or may be removable or releasable in nature, unless otherwise stated.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein, the terms "the," "a," or "an," mean "at least one," and should not be limited to "only one" unless explicitly indicated to the contrary. Thus, for example, reference to "a component" includes embodiments having two or more such components unless the context clearly indicates otherwise.

As used herein, the term "axial" and derivatives thereof, such as "axially," shall be understood to refer to a direction along the axis of a component about which the component is configured to rotate in operation of the apparatus described herein. Further, the term "radial" and derivatives thereof, such as "radially," shall be understood in relation to the axis of the aforementioned component. For example, "radially outboard" refers to further away from the axis, while "radially inboard" refers to nearer to the axis. The term "circumferential" and derivatives thereof, such as "circumferentially," shall be understood in relation to the axis of the aforementioned component. It is to be understood "axial," "radial," and "circumferential" and derivatives of these terms may be used in reference to different axes about which different components of the robotics corner module described herein are configured to rotate. Which of the axes "axial," "radial," "circumferential," and/or derivatives thereof refers to in a given usage of these terms shall be made explicit by the disclosure or otherwise made apparent by the surrounding context of the given usage within the disclosure.

Referring now to FIGS. 1-22, a robotics corner module 10 is shown. The robotics corner module 10 includes a traction drive unit 20, a steering drive unit 100, and an intermediate assembly 30 that extends between the traction drive unit 20 and the steering drive unit 100. A robot (not shown) may include multiple (e.g., four) robotics corner modules 10 fixed to a main chassis for maneuvering the robot. For example, the traction drive unit 20 can propel the robot, and the steering drive unit 100 can adjust the traction drive unit 20 to steer the robot in a particular direction. The robotics corner module 10 may be controlled by control circuitry (not shown), such as that of a robot computer, for autonomous operation of the robot, in some implementations.

Figure 2:
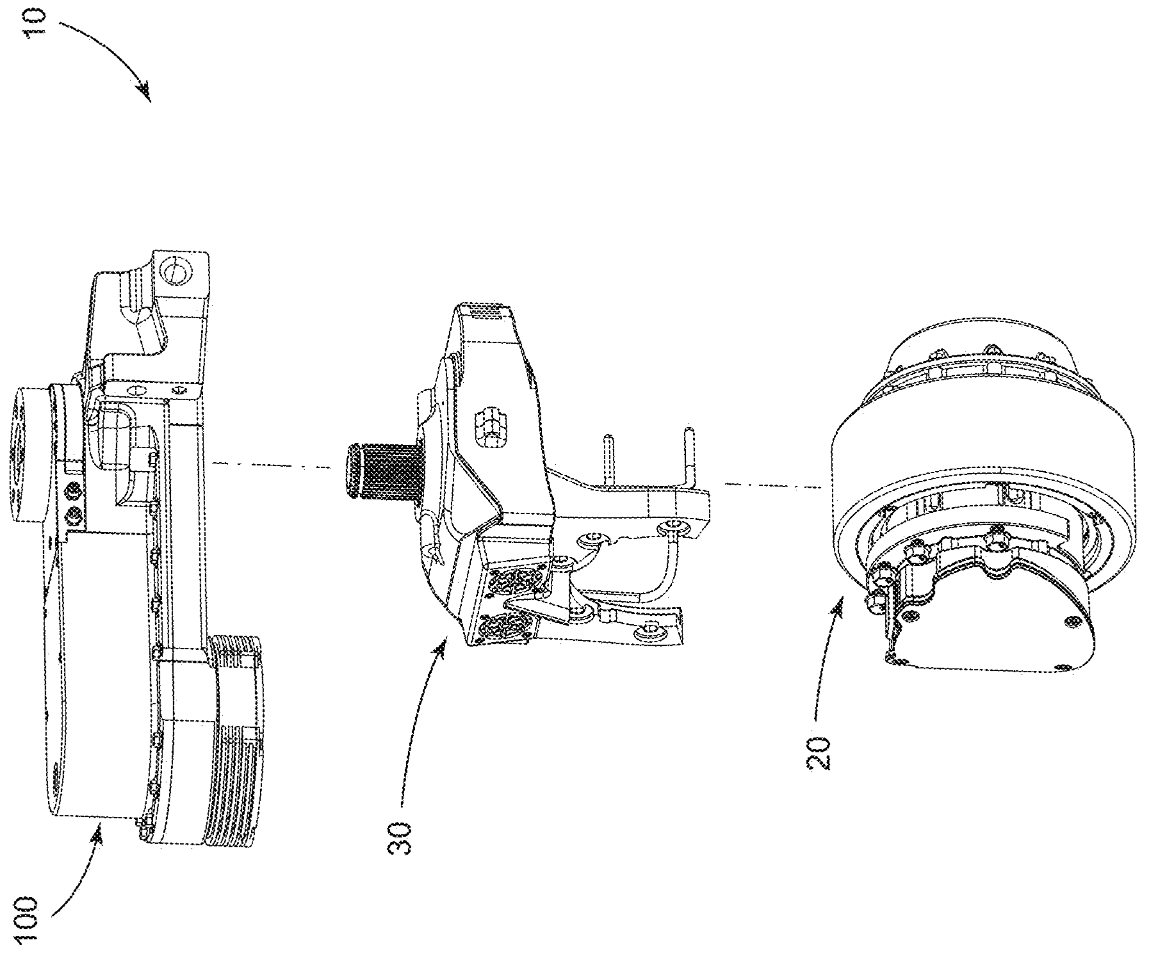
FIG. 2 is an exploded view of the robotics corner module of FIG. 1, illustrating a steering drive unit, an intermediate assembly, and a traction drive unit, according to one embodiment.
Figure 3:
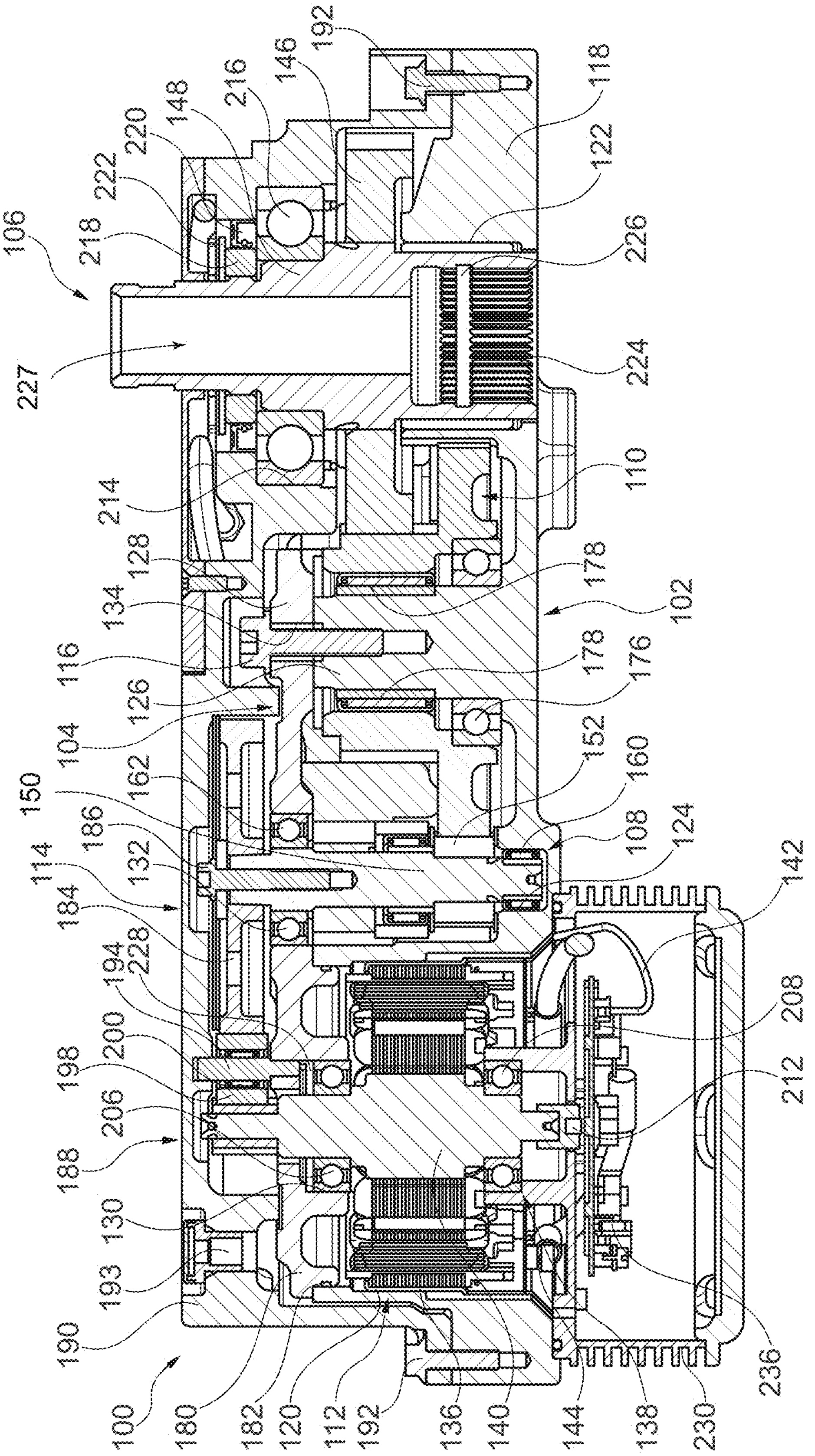
FIG. 3 is a cross-sectional view of the steering drive unit of FIG. 2, according to one embodiment.

Referring now to FIGS. 1-4B, the steering drive unit 100 for the robotics corner module 10 includes a lower housing assembly 102, a center housing assembly 104, an electric motor 112, an output shaft 106, a geartrain 114 and a fastener 116. The lower housing assembly 102 includes a lower housing 118 with a plurality of through bores 120, 122 and a counterbore 124. The lower housing assembly 102 also includes a shaft portion 126. The shaft portion 126 may be integrally formed with the lower housing 118 from a single piece of material or may be a separate component attached to the lower housing, in various embodiments. The center housing assembly 104 includes a center housing 128 with a plurality of through bores 130, 132, 134. The electric motor 112 includes a stator assembly 136 fixed in the through bore 120 of the lower housing 118 and a rotor assembly 138 with a rotor shaft 140 extending through the through bore 130 of the center housing 128. The electric motor 112 is operable to drive rotation of the rotor shaft 140 about a rotor shaft axis 40, as illustrated in FIG. 3. The through bore 120 of the lower housing 118 may be a tapered bore and the stator assembly 136 may be press-fit into the through bore 120, in an exemplary embodiment. As illustrated exemplarily in FIG. 4A, the electric motor 112 may include a thermocouple 142 affixed (e.g., with epoxy) to the stator assembly 136 for determining a temperature of the stator assembly 136. A busbar board 144 may be electrically connected to the stator assembly 136 for providing a multi-phase power to the stator assembly 136.

Figure 6A:
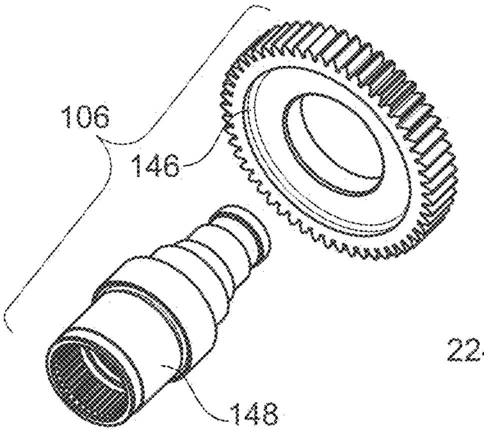
FIG. 6A is an exploded view of an output shaft of the steering drive unit of FIG. 2, according to one embodiment.
Figure 6B:
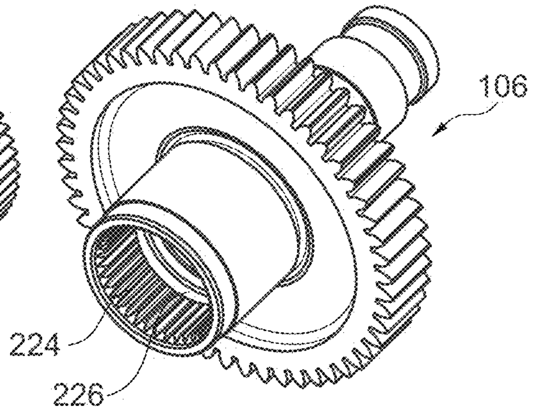
FIG. 6B is a perspective view of the output shaft of FIG. 6A in an assembled condition, according to one embodiment.
Figure 7A:
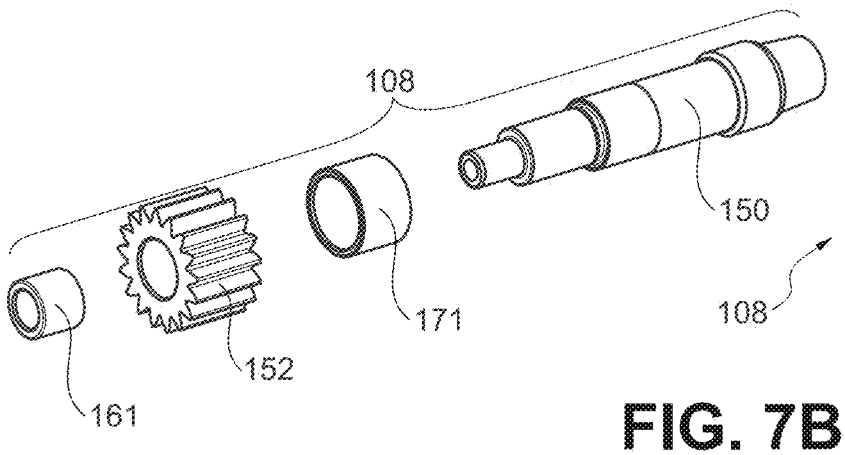
FIG. 7A is an exploded view of a shaft assembly of the steering drive unit of FIG. 2, according to one embodiment.
Figure 7B:
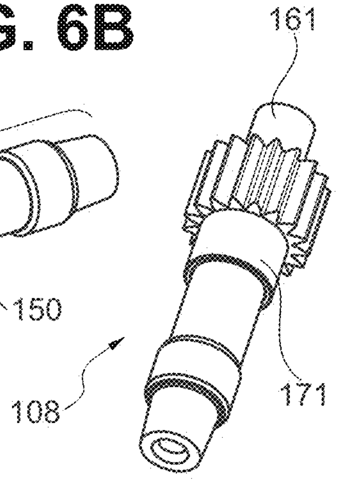
FIG. 7B is a perspective view of the shaft assembly of FIG. 7A in an assembled condition, according to one embodiment.

As illustrated exemplarily in FIGS. 3, 6A, and 6B, the output shaft 106 extends parallel to the rotor shaft 140 and is rotatably supported in the through bore 122 of the lower housing 118. In various implementations, the output shaft 106 is operably coupled to the rotor shaft 140 via the geartrain 114, such that rotation of the rotor shaft 140 about the rotor shaft axis 40 prompts rotation of the output shaft 106 about an output shaft axis 50 that is parallel to the rotor shaft axis 40 and radially offset from the rotor shaft axis 40, with respect to the rotor shaft axis 40. The output shaft 106 includes an output gear 146. The output gear 146 may be integrally formed with a shaft portion 148 of the output shaft 106 or, as shown in FIGS. 6A and 6B, may be a separate component fixed to the shaft portion 148 by, for example, press-fitting, shrink fitting, adhesives, staking and/or welding. It is contemplated that the output shaft 106 may be a single unitary body or may be an assembly of a plurality of components, in various embodiments.

Referring now to FIGS. 3 and 7A-8B, the geartrain 114 is arranged for driving connection between the rotor shaft 140 and the output shaft 106 as described in more detail below. The geartrain 114 includes a shaft assembly 108 and a compound gear assembly 110. The shaft assembly 108 includes a shaft 150 that extends parallel to the rotor shaft 140, and a gear 152. The gear 152 may be integrally formed with the shaft 150 or may be a separate component affixed to the shaft 150 similar to the output gear 146 discussed above. The shaft 150 is partially disposed in the counterbore 124 of the lower housing 118 and extends through the through bore 132 of the center housing 128. The compound gear assembly 110 is rotatably supported on the shaft portion 126 of the lower housing 118 and includes a gear portion 154 that is meshingly engaged with the output gear 146 of the output shaft 106 and a gear portion 156 that is meshingly engaged with the gear 152 of the shaft assembly 108. The gear portions 154, 156 of the compound gear assembly 110 may be integrally formed as a single unitary body or may be joined together. The fastener 116 extends through the through bore 134 of the center housing 128 and into the shaft portion 126 of the lower housing 118 to secure the center housing 128 to the lower housing 118.

Figure 4A:
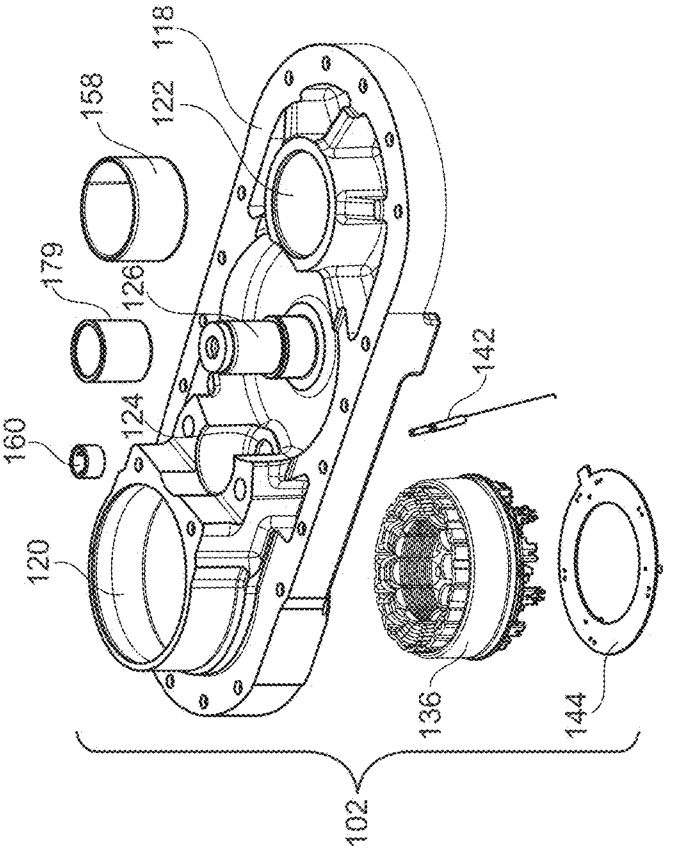
FIG. 4A is an exploded view of a lower housing assembly of the steering drive unit of FIG. 2, according to one embodiment.
Figure 4B:
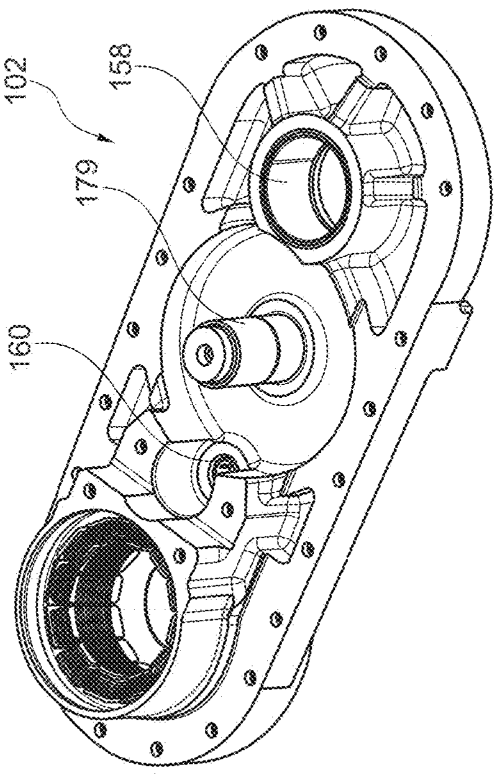
FIG. 4B is a perspective view of the lower housing assembly of FIG. 4A in an assembled condition, according to one embodiment.
Figure 5A:
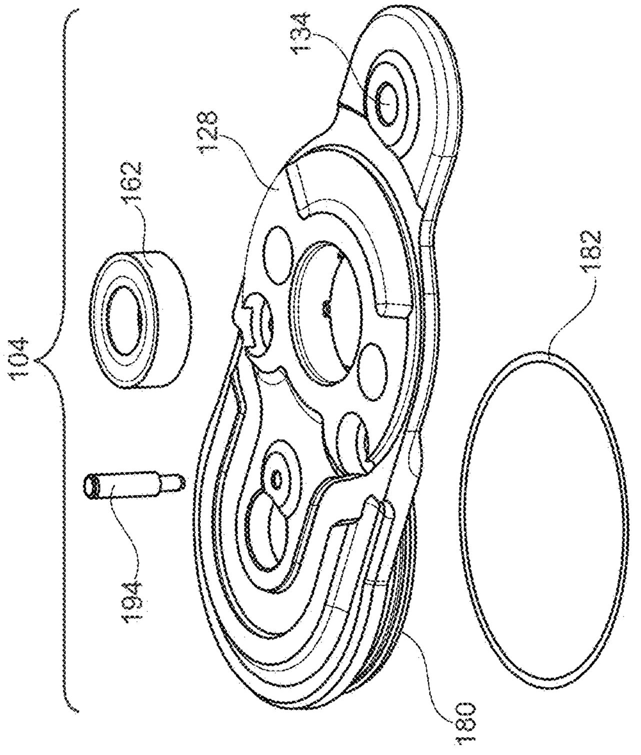
FIG. 5A is an exploded view of a center housing assembly of the steering drive unit of FIG. 2, according to one embodiment.
Figure 5B:
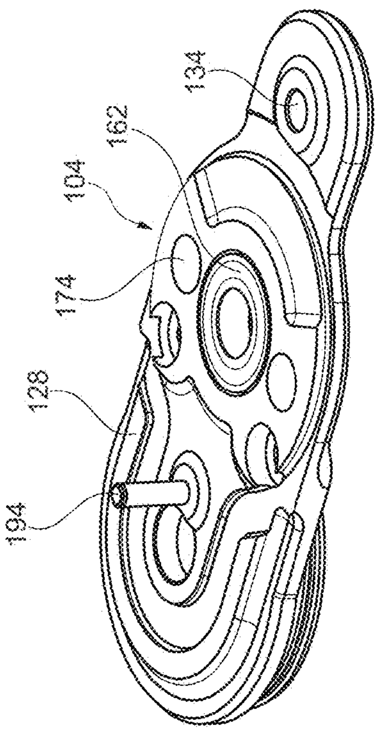
FIG. 5B is a perspective view of the center housing assembly of FIG. 5A in an assembled condition, according to one embodiment.

Referring now to FIGS. 3, 4A-5B, 7A, and 7B, the output shaft 106 is rotatably supported in the through bore 122 of the lower housing 118 by a bushing 158. For example, as shown in FIGS. 4A and 4B, the bushing 158 may be press-fit into the through bore 122 prior to installation of the output shaft 106 into the lower housing assembly 102, allowing free rotation of the shaft portion 148 in the lower housing 118 with reduced friction. The shaft 150 is rotatably supported in the counterbore 124 of the lower housing 118 by a needle bearing 160 and is rotatably supported in the through bore 132 of the center housing 128 by a ball bearing 162. As shown exemplarily in FIGS. 7A and 7B, the needle bearing 160 may be press-fit into the lower housing 118 prior to installation of the shaft 150 of the shaft assembly 108, allowing the shaft 150 to rotate freely in the lower housing 118 with reduced friction. Similarly, as shown in FIGS. 5A and 5B, the ball bearing 162 may be press-fit into the center housing 128 prior to installation of the shaft 150, allowing the shaft 150 to rotate freely in the housing with reduced friction. In some embodiments, the center housing 128 may be staked by deforming material of the housing to retain the bearing 162.

Figure 9A:
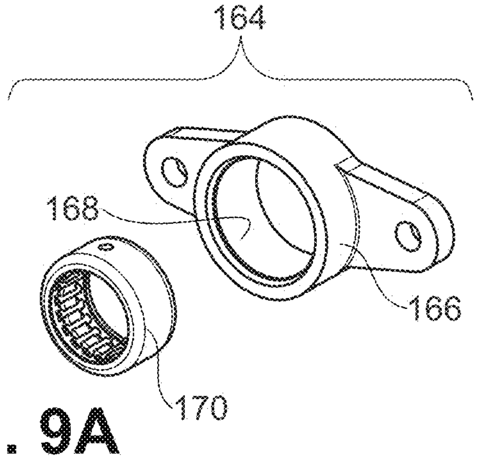
FIG. 9A is an exploded view of a bearing housing assembly of the steering drive unit of FIG. 2, according to one embodiment.
Figure 9B:
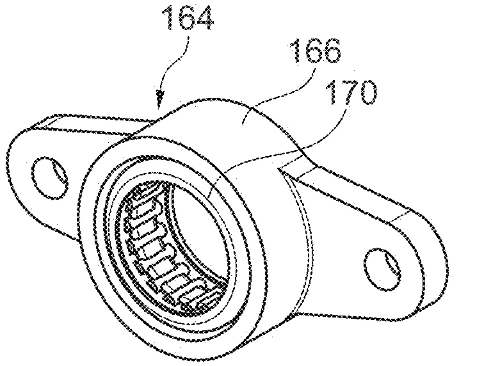
FIG. 9B is a perspective view of the bearing housing assembly of FIG. 9A in an assembled condition, according to one embodiment.
Figure 10A:
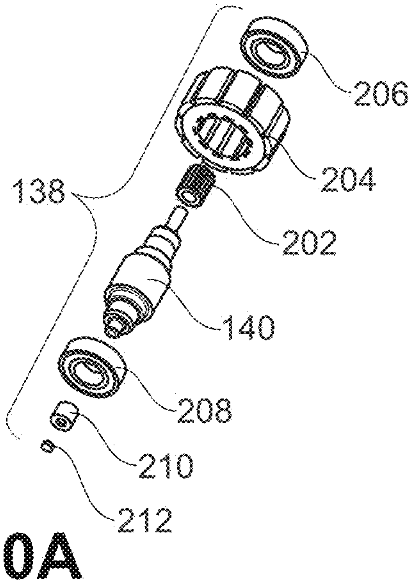
FIG. 10A is an exploded view of a rotor assembly of the steering drive unit of FIG. 2, according to one embodiment.
Figure 10B:
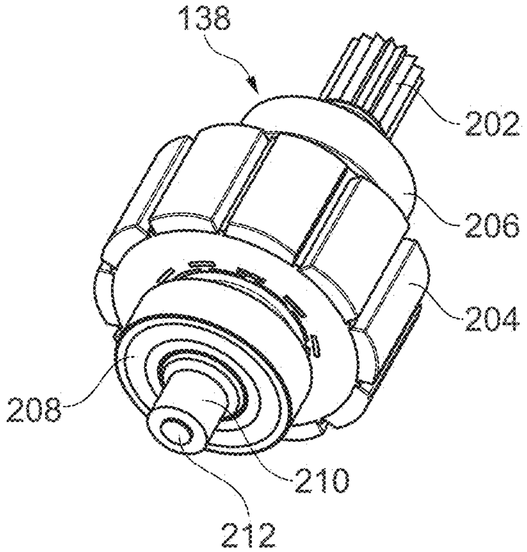
FIG. 10B is a perspective view of the rotor assembly of FIG. 10A in an assembled condition, according to one embodiment.
Figure 11A:
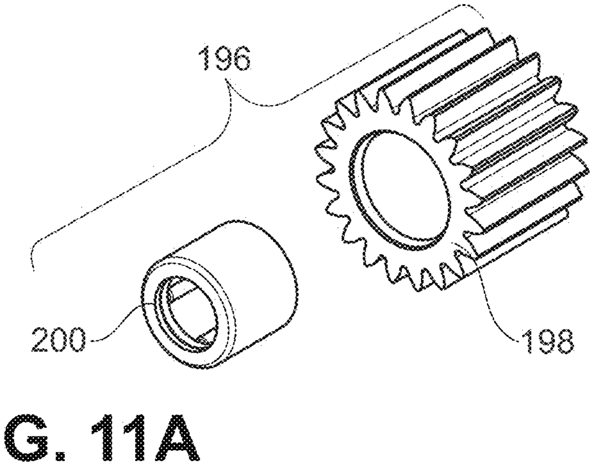
FIG. 11A is an exploded view of an idler gear assembly of the steering drive unit of FIG. 2, according to one embodiment.
Figure 11B:
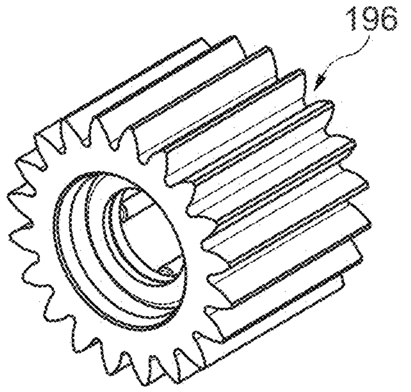
FIG. 11B is a perspective view of the idler gear assembly of FIG. 11A in an assembled condition, according to one embodiment.
Figure 12:
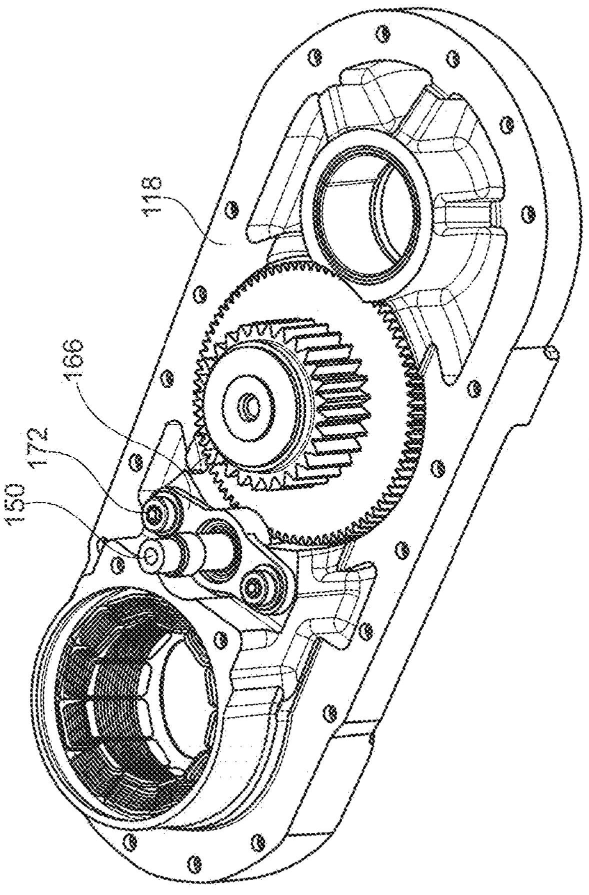
FIG. 12 is a perspective view of the steering drive unit of FIG. 2 in a partially assembled condition, according to one embodiment.

Referring now to FIGS. 9A, 9B, and 12, the steering drive unit may include a bearing housing, or bearing support block, 166 that is secured to the lower housing 118. The bearing housing 166 includes a through bore 168. The shaft 150 of the shaft assembly 108 is rotatably supported by a needle bearing 170 disposed in the through bore 168 of the bearing housing 166. For example, the needle bearing 170 may be press-fit into the through bore 168, forming the bearing housing assembly 164, and allowing the shaft 150 to rotate freely in the bearing housing 166 with reduced friction. The bearing housing 166 is secured to the lower housing 118 by one or more fasteners 172, as illustrated in FIG. 12. The shaft assembly 108 may include hardened races 161, 171 that are press-fit onto the shaft portion 150 to provide a hardened running surface for corresponding bearings 160, 170, respectively.

Figure 13:
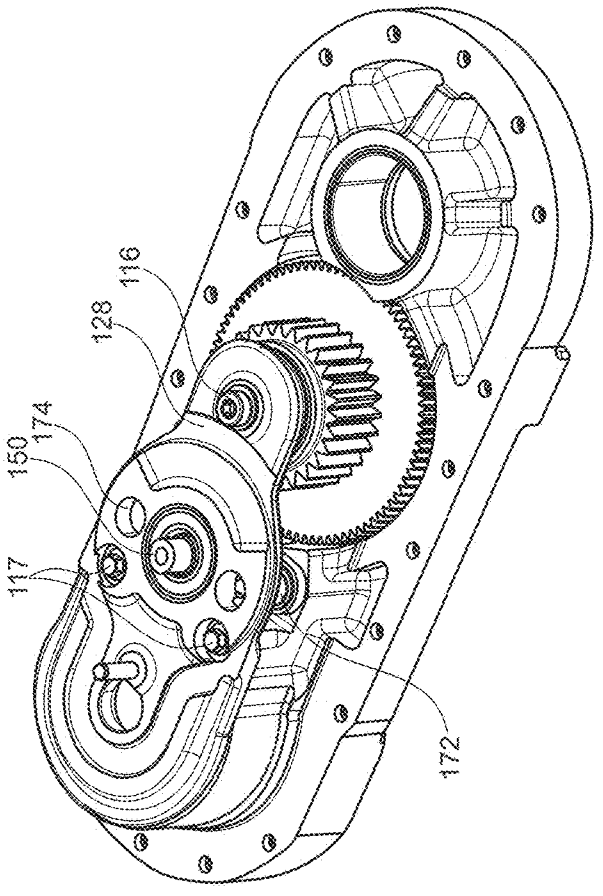
FIG. 13 is a perspective view of the partially assembled steering drive unit of FIG. 12 illustrated as assembled with a center housing of the steering drive unit, according to one embodiment.

Referring now to FIGS. 12 and 13, the center housing 128 includes access holes 174 to allow for tightening of the one or more fasteners 172. The access holes 174 permit installation of the center housing 128 on the lower housing 118 prior to the tightening of the fasteners 172. Clearance between the fasteners 172 and the bearing housing 166 permits the shaft 150 of the shaft assembly 108 to find a center between the bearings 160 in the lower housing 118 and the bearings 162 in the center housing 128 without binding from the bearing 170. In other words, the bearing housing 166 can float to align with the shaft 150 (instead of the shaft 150 aligning to the bearing housing 166) until the center housing 128 is secured and the fasteners 172 are tightened to fully secure the bearing housing assembly 164 to the lower housing 118. The access holes 174 permit a tool for tightening the fasteners 172 to extend through the center housing 128 to access the fasteners 172.

Figure 8A:
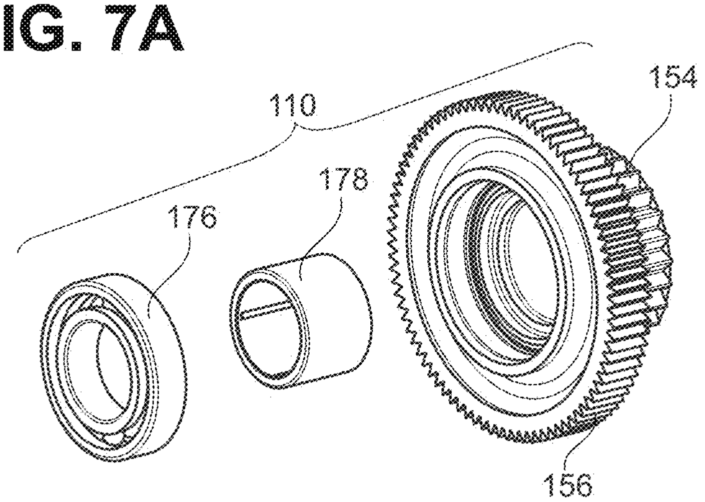
FIG. 8A is an exploded view of a compound gear assembly of the steering drive unit of FIG. 2, according to one embodiment.
Figure 8B:
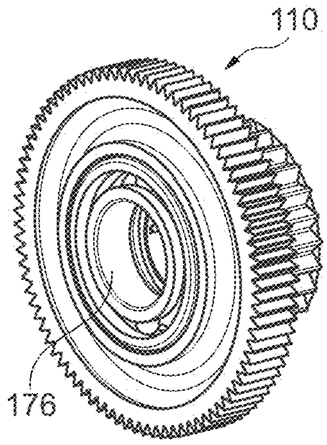
FIG. 8B is a perspective view of the compound gear assembly of FIG. 8A in an assembled condition, according to one embodiment.

Referring now to FIGS. 3, 8A, and 8B, the compound gear assembly 110 is rotatably supported on the shaft portion 126 of the lower housing 118 by a ball bearing 176 and a needle bearing 178. The lower housing assembly 102 may include a hardened sleeve 179 that is press-fit on the shaft portion 126 of the lower housing 118 and arranged to provide a hardened surface for the needle bearing 178 of the compound gear assembly 110 to rotate on. As illustrated in FIG. 3, the output gear 146, the gear 152, and the compound gear assembly 110 are disposed axially between the lower housing 118 and the center housing 128, with respect to the output shaft axis and/or the rotor shaft axis of the steering drive unit 100. It is contemplated that, in some embodiments, bearings 176, 178 may be replaced with a single bushing, eliminating the inner race, and the shaft portion 126 may include a single bushing support diameter.

Referring now to FIGS. 3, 5A, and 5B, the center housing 128 includes a cylindrical protrusion 180 that is disposed in the through bore 120 of the lower housing 118. The center housing assembly 104 includes an o-ring 182 that is sealingly engaged between the cylindrical protrusion 180 and the through bore 120. That is, the cylindrical protrusion 180 includes a groove, and the o-ring 182 may be installed in the groove prior to assembling the center housing assembly 104 to the lower housing 118. The o-ring 182 provides sealing to prevent grease, dust or other debris from entering the portion of through bore 120 where the stator assembly 136 is located, helping prolong a service life of the electric motor 112 of the steering drive unit 100.

Figure 14:
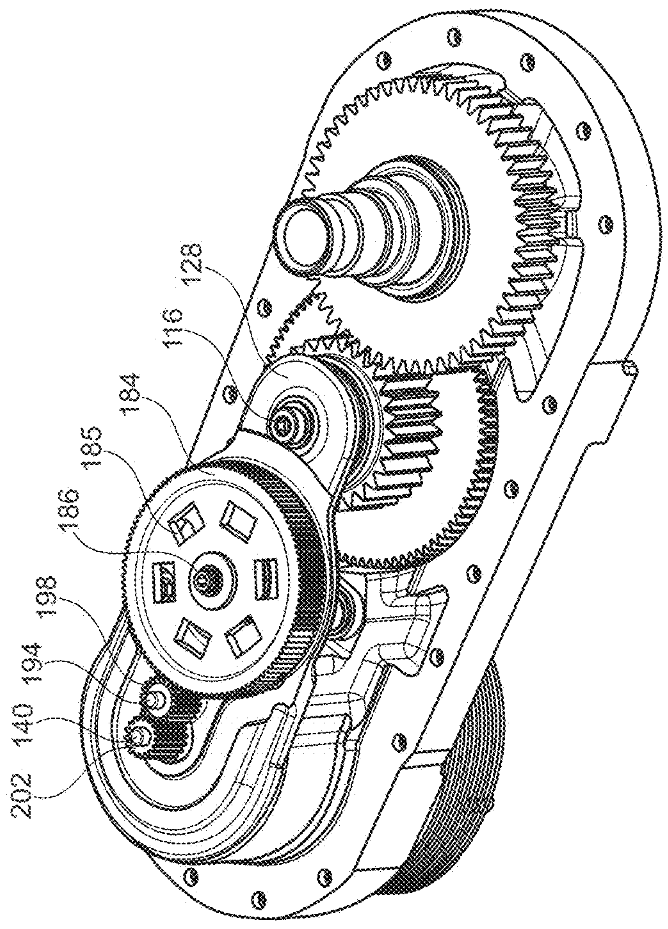
FIG. 14 is a perspective view of the partially assembled steering drive unit of FIG. 13 shown assembled with a second gear, according to one embodiment.

Referring now to FIGS. 3 and 14, the shaft assembly 108 also includes a gear 184 that is secured to the shaft 150 by a fastener 186. The shaft 150 may have a tapered portion and the gear 184 may include a tapered bore so that tightening of the fastener 186 wedges the two tapered areas together, and the gear 184 is securely fastened to the shaft 150 for cojoint rotation. In other words, the gear 184 is affixed to the shaft so that rotation of the gear 184 also rotates the shaft 150, and vice versa. The gear 184 is secured in this manner to allow assembly of the center housing 128 and the support bearing 162 prior to installation of the gear 184.

Figure 15:
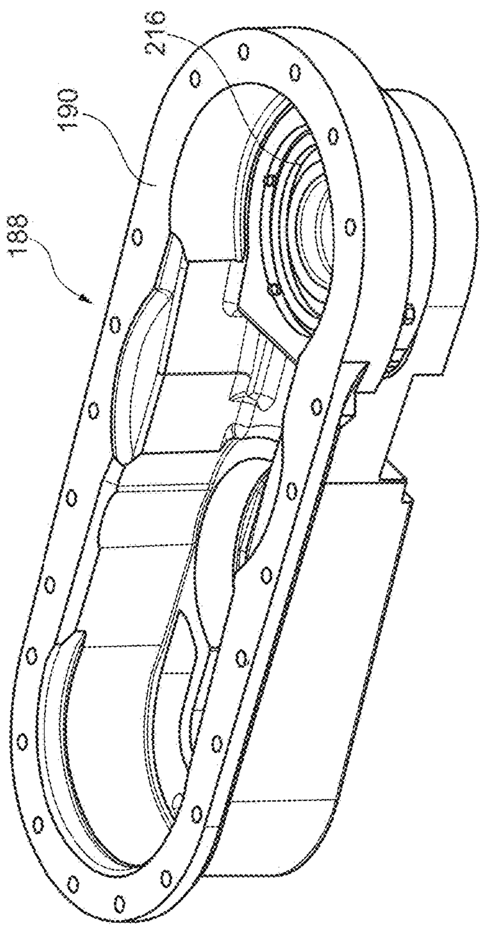
FIG. 15 is a perspective view of an upper housing assembly of the steering drive unit of FIG. 2, according to one embodiment.

Referring now to FIGS. 2, 3, and 15, the steering drive unit 100 also includes an upper housing assembly 188 with an upper housing 190 secured to the lower housing 118 (e.g., via fasteners 192). In the exemplary embodiment illustrated in FIG. 3, the gear 184 is disposed axially between the center housing 128 and the upper housing 190. A housing vent 193 may be threaded into the upper housing 190.

Referring now to FIGS. 3, 5A, 5B, 11A, 11B, and 14, the center housing assembly 104 also includes a shaft 194 fixed in the center housing 128. The geartrain 114 includes an idler gear assembly 196 with an idler gear 198 rotatably supported on the shaft 194 and meshingly engaged with the gear 184. In an exemplary embodiment, the idler gear assembly 196 may include a needle bearing 200 that is press-fit into the idler gear 198 allowing free rotation of the idler gear 198 on the shaft 194 fixed to the center housing 128 with minimal friction.

Referring now to FIGS. 3, 10A, 10B, and 14, the rotor assembly 138 of the steering drive unit 100 includes a pinion gear 202 fixed to the rotor shaft 140 and meshingly engaged with the idler gear 198. The rotor assembly 138 also includes rotor laminations with bonded permanent magnets 204, bearings 206, 208, a magnet housing 210, and a magnet 212 secured to the rotor shaft 140. The magnet 212 may be glued in the magnet housing 210, in some implementations. The bearings 206, 208 allow low friction rotation of the rotor assembly 138, and the magnet 212 provides rotation information of the rotor shaft 140 to a driver board 236 of the steering drive unit 100 for proper synchronization of the multi-phase power supplied to the stator assembly 136.

Referring again to FIG. 3, the upper housing assembly 188 may be secured to the lower housing assembly 102 via the fasteners 192, for example. The upper housing assembly 188 includes the upper housing 190 with a through bore 214 and a ball bearing 216 secured in the through bore 214. The ball bearing 216 may be a four point contact bearing that is press-fit in the through bore 214, in an exemplary embodiment. The steering drive unit 100 also includes a bearing nut 218 that is threaded onto the shaft portion 148 of the output shaft 106 to secure the ball bearing 216 to the output shaft 106. The through bore 214 and the shaft portion 148 include respective stepped diameters and the bearing 216 is arranged axially between the stepped diameters. The upper housing assembly 188 also includes a seal 220 arranged to seal the bearing nut 218 to the through bore 214. The steering drive unit 100 also includes an encoder target 222 that is fastened to the bearing nut 218 for detecting rotation or angular position of the output shaft 106. The output shaft 106 can include an internal spline portion 224 arranged for driving engagement with a connecting shaft 225 and a ring groove 226 may be arranged for receiving a ring to axially secure the connecting shaft 225 to the output shaft 106, with respect to the output shaft axis 50. As illustrated in FIG. 3, the output shaft 106 defines a hollow 227. The hollow 227 may form a portion of a wiring passage 229 that receives one or more wires 231 that are in communication with an inline driver board 233 of the traction drive unit 20, as described further herein.

During operation of an exemplary embodiment of the steering drive unit 100 of the robotics corner module 10, the electric motor 112 drives rotation of the rotor shaft 140 of the steering drive unit 100 about the rotor shaft axis 40, which drives the parallel axis gearing arrangement, such that the output shaft 106 rotates about the output shaft axis 50, which is parallel to the rotor shaft axis 40 and radially offset from the rotor shaft axis 40, with respect to the rotor shaft axis 40. Torque flows through the pinion gear 202, the idler gear 198, the gear 184 through shaft 150 to gear 152, the compound gear assembly 110 to the output gear 146 before outputting on the spline 224 of the output shaft 106 to the connecting shaft 225 of the intermediate assembly 30 and onward to the traction drive unit 20. In an exemplary implementation, a total gear ratio of about 64:1 is achieved with the depicted components, and a pair of dead stops that are 220 degrees apart on the lower housing assembly 102 may restrict the total travel to +/−110 degrees.

Referring now to FIGS. 1, 2, 16, and 17, the robotics corner module 10 includes the traction drive unit 20. The traction drive unit 20 is operably coupled to the output shaft 106 of the steering drive unit 100 via a support structure 250 of the intermediate assembly 30 that extends between the steering drive unit 100 and the traction drive unit 20, such that rotation of the output shaft 106 about the output shaft axis 50 drives rotation of the support structure 250 and the traction drive unit 20 about the output shaft axis 50. The traction drive unit 20 includes an electric motor 252 that is configured to drive rotation of a wheel 254 of the traction drive unit 20 for movement of the robotics corner module 10 and robot attached thereto, as described further herein.

Figure 16:
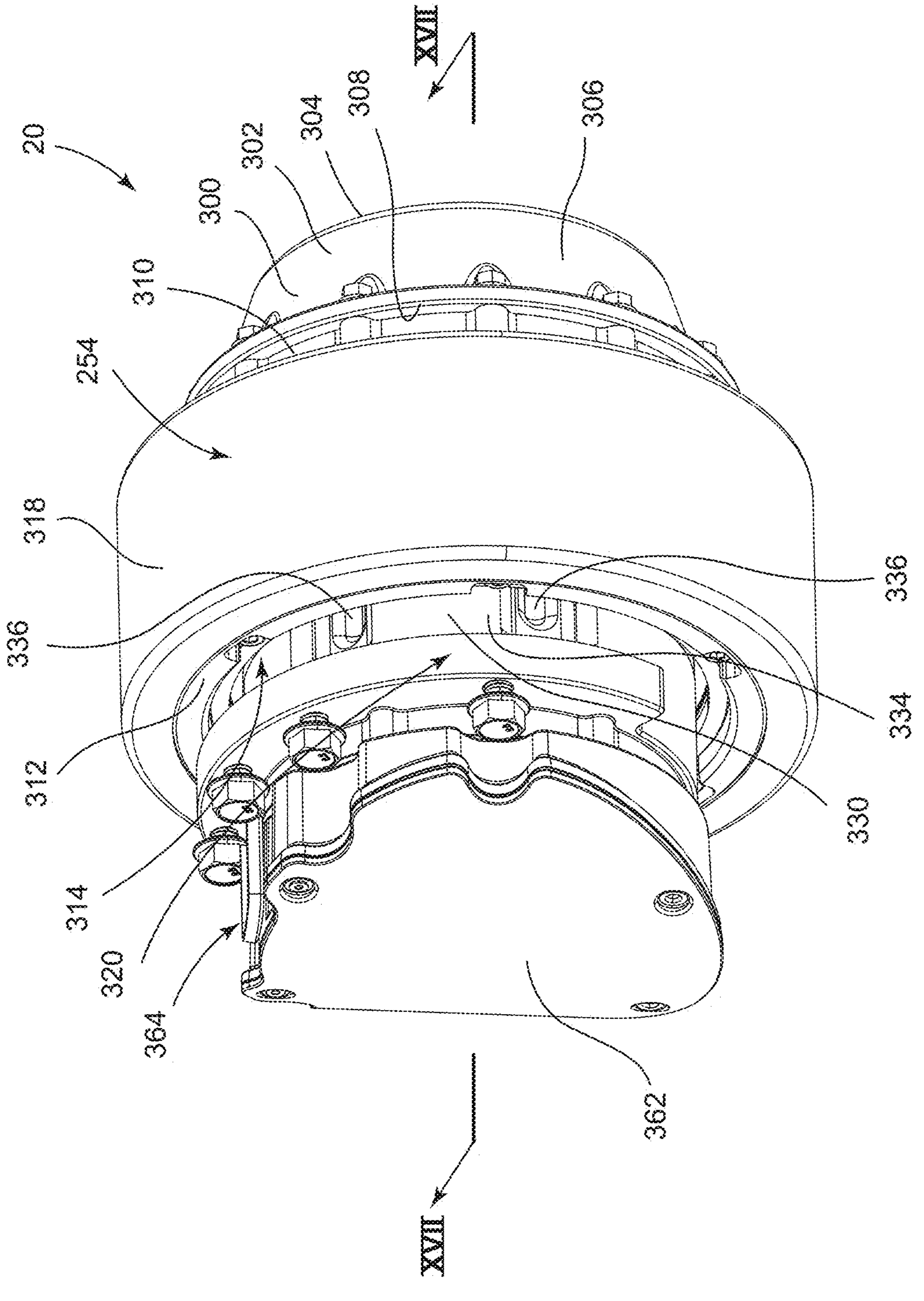
FIG. 16 is a perspective view of a traction drive unit of a robotics corner module, according to one embodiment.
Figure 17:
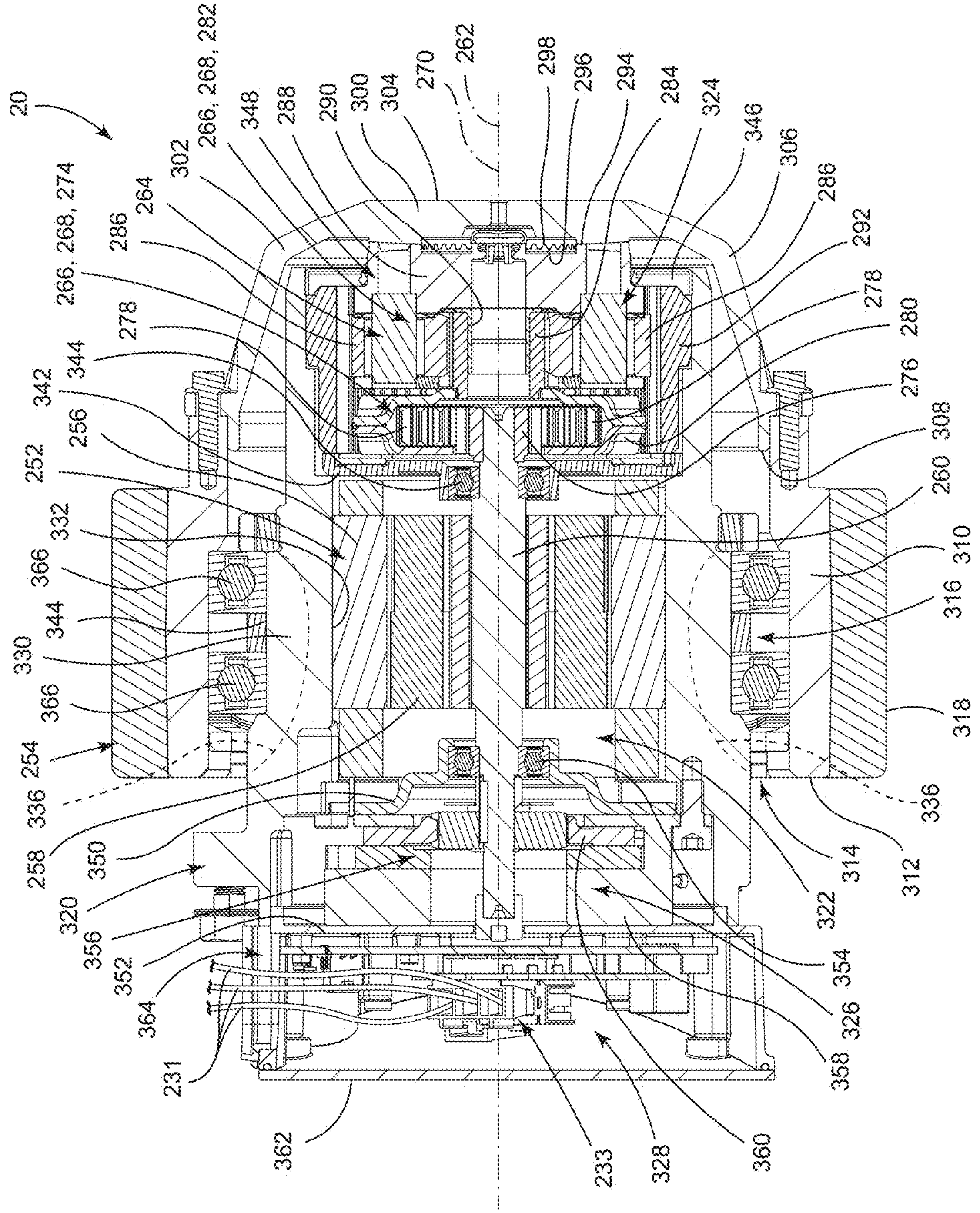
FIG. 17 is a cross-sectional view of the traction drive unit of FIG. 16, according to one embodiment.

Referring now to FIGS. 16 and 17, the traction drive unit 20 includes the electric motor 252, which can include a stator 256 and a rotor 258 that is configured to drive rotation of a rotor shaft 260 of the traction drive unit 20 about a rotor shaft axis 262, in various embodiments. The rotor shaft 260 of the traction drive unit 20 can be operably coupled with the wheel 254 of the traction drive unit 20, such that rotation of the rotor shaft 260 drives rotation of the wheel 254 in operation of the traction drive unit 20. In various implementations, the traction drive unit 20 of the robotics corner module 10 includes a geartrain 264. The geartrain 264 can include one or more gearsets 266, such as one or more planetary gearsets 268, as described further herein. In various implementations, the wheel 254 is operably coupled with the rotor shaft 260 of the traction drive unit 20 via the geartrain 264 of the traction drive unit 20, such that rotation of the rotor shaft 260 of the traction drive unit 20 drives rotation of the wheel 254 about a wheel axis 270 that is parallel to and radially aligned (i.e., coaxial) with the rotor shaft axis 262 of the traction drive unit 20.

In the exemplary embodiment of the traction drive unit 20 illustrated in FIG. 17, the geartrain 264 of the traction drive unit 20 includes a first planetary gearset 274. The first planetary gearset 274 includes a sun gear 276 that is coupled to the rotor shaft 260 of the traction drive unit 20, such that the sun gear 276 and the rotor shaft 260 of the traction drive unit 20 are operable to rotate about the rotor shaft axis 262 of the traction drive unit 20 at a common rate of rotation. The first planetary gearset 274 further includes a plurality of planet gears 278 that are engaged with the sun gear 276 and configured to revolve about the rotor shaft axis 262 of the traction drive unit 20. A carrier 280 rotates about the rotor shaft axis 262 of the traction drive unit 20 at a rate corresponding with a rate that the planet gears 278 of the first planetary gearset 274 revolve about the rotor shaft axis 262 of the traction drive unit 20.

As further illustrated in FIG. 17, the geartrain 264 of the traction drive unit 20 can include a second planetary gearset 282. The second planetary gearset 282 can include a sun gear 284. The sun gear 284 can be coupled to the carrier 280 of the first planetary gearset 274. In various implementations, the sun gear 284 is configured to rotate with the carrier 280 of the first planetary gearset 274 at a common rate of rotation about the rotor shaft axis 262 of the traction drive unit 20. The second planetary gearset 282 of the geartrain 264 can include a plurality of planet gears 286 that are engaged with the sun gear 284 of the second planetary gearset 282 and configured to revolve about the rotor shaft axis 262 of the traction drive unit 20. The second planetary gearset 282 further includes a carrier 288 that rotates about the rotor shaft axis 262 of the traction drive unit 20 at a rate of rotation corresponding with a rate that the planet gears 286 of the second planetary gearset 282 revolve about the rotor shaft axis 262 of the traction drive unit 20.

Referring still to FIG. 17, the carrier 288 of the second planetary gearset 282 includes an axially distal face 294. The axially distal face 294 of the carrier 288 faces axially away from the electric motor 252 of the traction drive unit 20 with respect to the rotor shaft axis 262 of the traction drive unit 20. In some embodiments, the axially distal face 294 of the carrier 288 of the second planetary gearset 282 may be engaged with the wheel 254 of the traction drive unit 20. For example, as illustrated in FIG. 17, the axially distal face 294 of the carrier 288 includes a spline interface 296 that is engaged with a corresponding spline interface 298 of a wheel hub 300 of the wheel 254 that faces axially toward the electric motor 252 of the traction drive unit 20, as described further herein.

As illustrated in FIG. 17, a bushing 290 may be disposed within a hollow defined by the sun gear 284 of the second planetary gearset 282 and may include a flanged end portion. The flanged end portion of the bushing 290 may extend radially outboard and axially between the sun gear 284 of the second planetary gearset 282 and the carrier 288 of the second planetary gearset 282 with respect to the rotor shaft axis 262 of the traction drive unit 20. In various implementations, the geartrain 264 of the traction drive unit 20 includes a ring gear 292. With respect to the rotor shaft axis 262 of the traction drive unit 20, the ring gear 292 of the geartrain 264 may be rotationally fixed and positioned radially outboard of the plurality of planet gears 278 of the first planetary gearset 274 and/or the plurality of planet gears 286 of the second planetary gearset 282. In the embodiment illustrated in FIG. 17, the ring gear 292 is rotationally fixed, is positioned radially outboard of the pluralities of planet gears 278, 286 of the first and second planetary gearsets 274, 282, and is engaged with the plurality of planet gears 278 of the first planetary gearset 274 and the plurality of planet gears 286 of the second planetary gearset 282. As such, in operation of the traction drive unit 20, the planet gears 278, 286 of the first and second planetary gearsets 274, 282 of the geartrain 264 mesh with the ring gear 292 of the geartrain 264 as the planet gears 278, 286 revolve about the rotor shaft axis 262 of the traction drive unit 20 at their respective rates.

Referring now to FIGS. 1, 2, 16, 17, and 22, the traction drive unit 20 includes the wheel 254. The wheel 254 is configured to be driven by the electric motor 252 of the traction drive unit 20. The wheel 254 includes the wheel hub 300. The wheel hub 300 may be operably coupled to the electric motor 252 of the traction drive unit 20. In various implementations, the wheel hub 300 is operably coupled to the electric motor 252 of the traction drive unit 20 via the rotor shaft 260 and the geartrain 264 of the traction drive unit 20. For example, as illustrated in FIG. 17, the wheel hub 300 is engaged with the spline interface 296 of the carrier 288 of the second planetary gearset 282 of the geartrain 264 via the corresponding spline interface 298 of the wheel hub 300 that faces axially toward the electric motor 252 of the traction drive unit 20. In various implementations, the wheel hub 300 may additionally or alternatively be engaged with the geartrain 264 (e.g., the carrier 288 of the second planetary gearset 282) via fasteners, such as bolts, that extend axially through the wheel hub 300 and engage at least a portion of the geartrain 264 to couple the wheel hub 300 to the geartrain 264. The spline interface 296 of the carrier 288 of the second planetary gearset 282 of the geartrain 264 and the corresponding spline interface 298 of the wheel hub 300 that engages the spline interface 296 of the carrier 288 may advantageously distribute torsional forces from the geartrain 264 to the wheel 254 in a manner that reduces wear on individual components of the traction drive unit 20, such as the fasteners that connect the wheel hub 300 and the geartrain 264. In various implementations, the wheel hub 300 and the carrier 288 of the second planetary gearset 282 are engaged with each other via the spline interface 296 and the corresponding spline interface 298, such that the wheel hub 300 and the carrier 288 of the second planetary gearset 282 rotate at a common rate of rotation.

In some embodiments, the wheel hub 300 can include a plurality of components. In the embodiment illustrated in FIG. 17, the wheel hub 300 includes a cap portion 302 that is generally cup-shaped. A base 304 of the cup-shaped cap portion 302 includes the corresponding spline interface 298, and a sidewall 306 of the cap portion 302 extends axially toward the axial position of the electric motor 252 to a rim 308 of the cap portion 302. As illustrated in FIG. 17, the wheel hub 300 further includes a ring-shaped portion 310 that is mounted to the cap portion 302 proximate to the rim 308 of the cap portion 302 via fasteners. The ring-shaped portion 310 extends axially away from the cap portion 302 of the wheel hub 300 to an end 312 of the wheel hub 300 that is distal from the base 304 of the cap portion 302. The end 312 of the wheel hub 300 defines an opening 314 to a wheel hub cavity 316, as described further herein. The wheel 254 further includes a wheel rim 318. The wheel rim 318 extends radially outboard from the wheel hub 300, with respect to the rotor shaft axis 262 of the traction drive unit 20. As illustrated in FIG. 17, the wheel rim 318 extends radially outboard from the ring-shaped portion 310 of the wheel hub 300. In various implementations, the wheel rim 318 may interface with the floor or surface upon which the robotics corner module 10 of the robot resides. It is contemplated that a tire may be positioned about the wheel rim 318 of the wheel 254, in some implementation. It is further contemplated that the wheel hub 300 may include more or fewer components than the embodiment illustrated in FIG. 17, and further that the wheel hub 300 and wheel rim 318 may be formed as a single unitary body, in some implementations.

Figure 21:
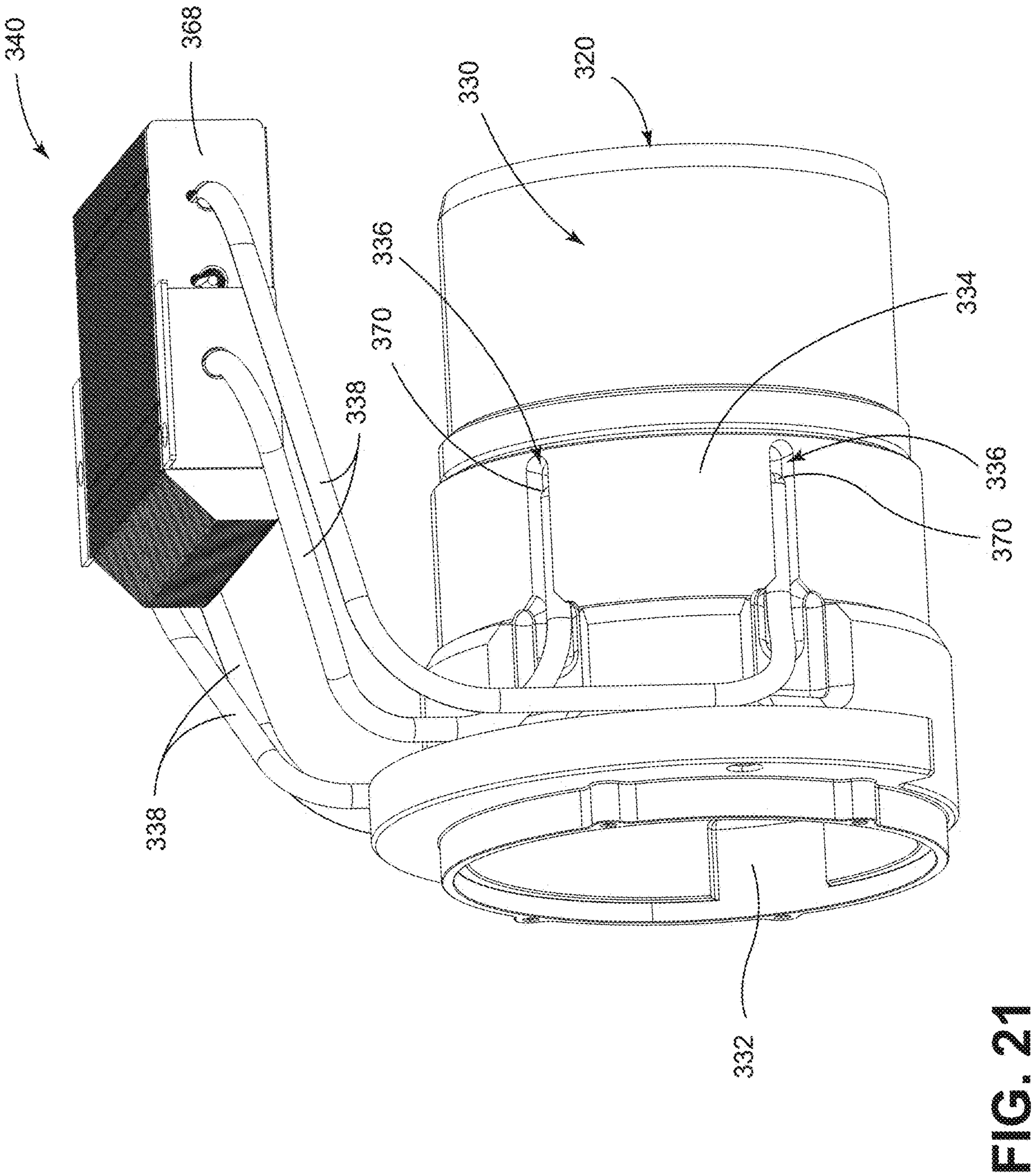
FIG. 21 is a perspective view of a main body of a housing of a traction drive unit of a robotics corner module that defines a plurality of recessed grooves in an outer surface of the main body, and a radiator of an intermediate assembly of a robotics corner module having a plurality of conduits extending outward therefrom and within the recessed grooves of the main body of the housing, according to one embodiment.

Referring now to FIGS. 16, 17, 21, and 22, the traction drive unit 20 includes a traction drive unit housing 320. The traction drive unit housing 320 can be an assembly of a plurality of components, in some examples. For example, the traction drive unit housing 320 can be a die-cast aluminum housing that is formed of a plurality of components. The housing 320 can define a motor housing region 322, a gearbox region 324, an electric brake housing region 326, and/or an electronics compartment 328, in various embodiments. The traction drive unit housing 320 includes a main body 330. The main body 330 of the traction drive unit housing 320 has an inner surface 332 that defines the motor housing region 322 that houses the electric motor 252 of the traction drive unit 20. As illustrated in FIGS. 17 and 21, the main body 330 further includes an outer surface 334 opposite the inner surface 332. As illustrated in FIGS. 17 and 21, in various implementations, the outer surface 334 of the main body 330 includes a groove 336 that, with respect to the rotor shaft axis 262 of the traction drive unit 20, is recessed in the radially-inboard direction. As illustrated in FIG. 17, the groove 336 is axially aligned with the electric motor 252 of the traction drive unit 20 with respect to the rotor shaft axis 262 of the traction drive unit 20. In various implementations, the outer surface 334 of the main body 330 of the traction drive unit housing 320 includes a plurality of grooves 336, and the plurality of grooves 336 are configured to receive corresponding conduits 338 of a cooling system 340 of the intermediate assembly 30 of the robotics corner module 10, as described further herein.

Figure 22:
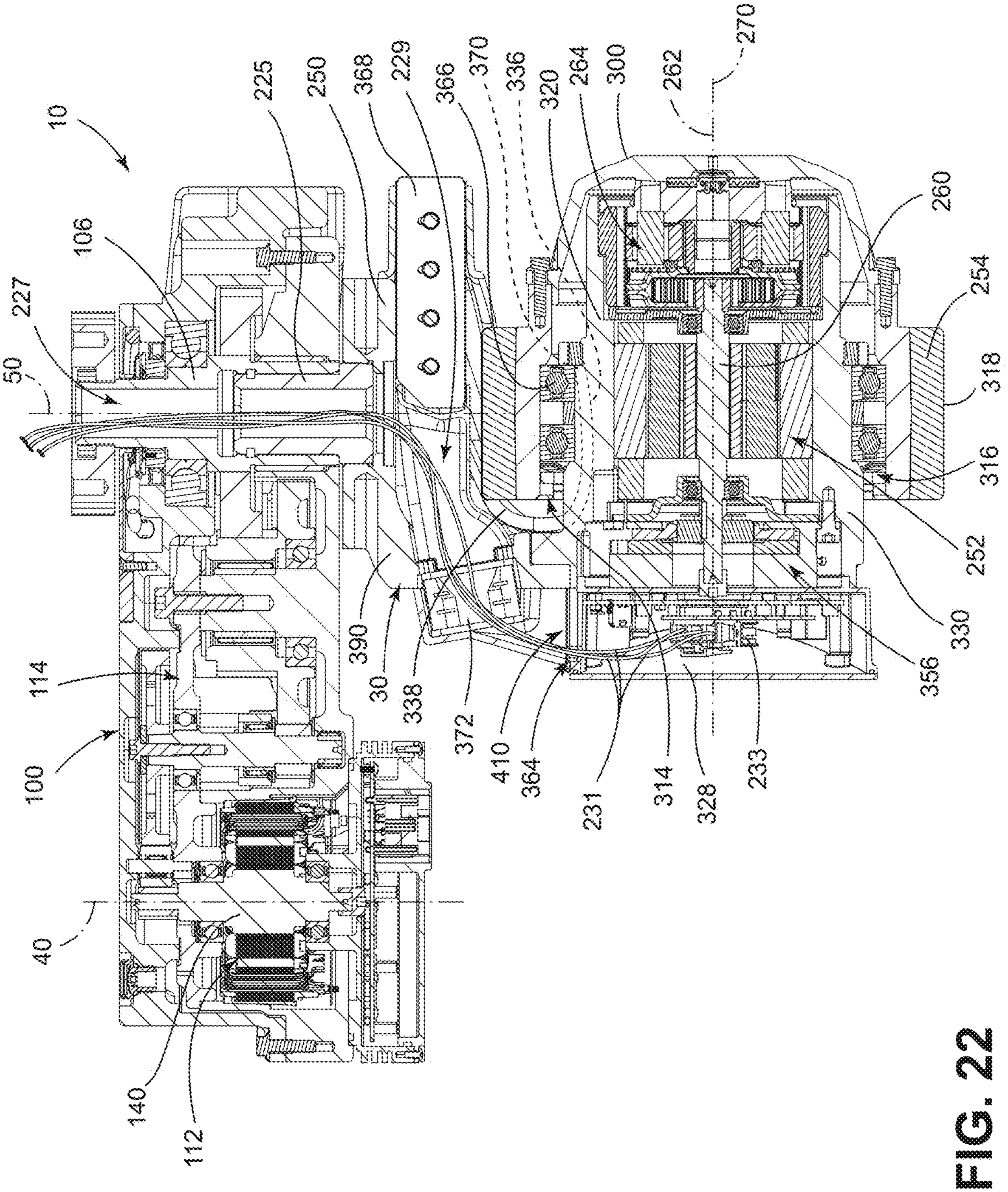
FIG. 22 is a cross-sectional view of the robotics corner module of FIG. 1, illustrating the steering drive unit, the intermediate assembly, and the traction drive unit in an assembled condition, according to one embodiment.

Referring now to FIGS. 17, 21, and 22, the main body 330 of the traction drive unit housing 320 defines the motor housing region 322. As illustrated in FIG. 17, the motor housing region 322 houses the electric motor 252 of the traction drive unit 20. In various embodiments, the main body 330 of the traction drive unit housing 320 further defines the gearbox region 324 of the traction drive unit housing 320. The gearbox region 324 is defined by the main body 330 of the traction drive unit housing 320 on a first axial side of the motor housing region 322 with respect to the rotor shaft axis 262 of the traction drive unit 20. In the embodiment illustrated in FIG. 17, the traction drive unit housing 320 includes a bearing shield 342 that, with respect to the rotor shaft axis 262 of the traction drive unit 20, extends radially inboard from the inner surface 332 of the main body 330 between the motor housing region 322 and the gearbox region 324. As illustrated, the gearbox region 324 houses the geartrain 264 of the traction drive unit 20, which is disposed on the first axial side of the bearing shield 342 that extends between the motor housing region 322 and the gearbox region 324. As illustrated in FIG. 17, a bearing 344, such as a sealed ball bearing, is coupled with the bearing shield 342 extending between the motor housing region 322 and the gearbox region 324 and extends radially inboard therefrom within a central aperture defined by the bearing shield 342. The bearing 344 may be a variety of types of bearings, in various implementations. In the illustrated embodiment, the bearing 344 that is coupled to the bearing shield 342 extending between the motor housing region 322 and the gearbox region 324 supports and facilitates rotation of the rotor shaft 260 of the traction drive unit 20 that extends through the central aperture of the bearing shield 342 from the motor housing region 322 to the gearbox region 324.

Referring now to FIG. 17, the traction drive unit housing 320 can include a gearbox end plate 346. The gearbox end plate 346 may cooperate with the main body 330 and the bearing shield 342 extending between the motor housing region 322 and the gearbox region 324 to define the gearbox region 324 of the traction drive unit housing 320. As illustrated in FIG. 17, the gearbox end plate 346 extends radially inboard with respect to the rotor shaft axis 262 of the traction drive unit 20 from the inner surface 332 of the main body 330 toward the carrier 288 of the second planetary gearset 282. In the illustrated embodiment, the carrier 288 of the second planetary gearset 282 extends axially through a gearbox end plate opening 348 defined by the gearbox end plate 346, such that the axially distal face 294 of the carrier 288 is positioned axially beyond the gearbox end plate 346 outside of the gearbox region 324 of the traction drive unit housing 320. It is contemplated that a seal, such as a dynamic seal, may be disposed radially between the carrier 288 and the gearbox end plate 346, such that the gearbox region 324 is sealed at the gearbox end plate opening 348 to, for example, ensure that fluids, such as oil, are restricted from leaking out of the gearbox region 324 via the gearbox end plate opening 348. In the embodiment illustrated in FIG. 17, the bearing shield 342 extending between the motor housing and gearbox regions 322, 324 and the gearbox end plate 346 of the traction drive unit housing 320 are fixed to the inner surface 332 of the main body 330. It is contemplated that, in some implementations, the bearing shield 342 and/or the gearbox end plate 346 may be integral with the main body 330 of the traction drive unit housing 320.

Referring now to FIG. 17, in various embodiments, the traction drive unit housing 320 defines an electric brake housing region 326. In some implementations, the main body 330 of the traction drive unit housing 320 defines the electric brake housing region 326. In some embodiments, wherein the gearbox region 324 defined by the traction drive unit housing 320 is disposed on a first axial side of the motor housing region 322 (with respect to the rotor shaft axis 262 of the traction drive unit 20), the electric brake housing region 326 is disposed on a second axial side of the motor housing region 322 opposite the first axial side. For example, in the embodiment illustrated in FIG. 17, the motor housing region 322 is positioned axially between the gearbox region 324 and the electric brake housing region 326. In the illustrated embodiment, a bearing shield 350 extends radially inboard, with respect to the rotor shaft axis 262 of the traction drive unit 20, from the inner surface 332 of the main body 330 of the traction drive unit housing 320 between the motor housing region 322 and the electric brake housing region 326. As such, the gearbox region 324 of the traction drive unit housing 320 is cooperatively defined by the main body 330, the bearing shield 342 that extends between the motor housing region 322 and the gearbox region 324, and the gearbox end plate 346; the motor housing region 322 is defined by the main body 330, the bearing shield 342 that extends between the motor housing region 322 and the gearbox region 324, and the bearing shield 350 that extends between the motor housing region 322 and the electric brake housing region 326; and the electric brake housing region 326 is defined by the main body 330, the bearing shield 350 that extends between the motor housing region 322 and the electric brake housing region 326, and a partition 352, as described further herein.

As illustrated in FIG. 17, the bearing shield 350 that extends between the motor housing region 322 and electric brake housing region 326 defines a central aperture within which a bearing 354 that is coupled to the bearing shield 350 is seated. The bearing 354 is configured to support and facilitate rotation of the rotor shaft 260 that extends through the central aperture defined by the bearing shield 350 that extends between the motor housing region 322 and electric brake housing region 326 into the electric brake housing region 326, as illustrated in FIG. 17.

Referring still to FIG. 17, the traction drive unit 20 includes an electric brake 356. The electric brake 356 is disposed within the electric brake housing region 326 of the traction drive unit housing 320, as illustrated in FIG. 17. The electric brake 356 can include a brake coil 358 that is selectively energized, a brake armature 360 that moves due to magnetic force applied when the brake coil 358 is energized, and a stationary component that selectively contacts the brake armature 360 to create friction while the brake coil 358 is energized in order to slow and/or prevent rotation of the rotor shaft 260, which is coupled to the brake armature 360 by, for example, a keyed connection. A variety of types of electric brakes 356 are contemplated.

Referring now to FIGS. 17 and 22, the traction drive unit housing 320 can define an electronics compartment 328. In various implementations, the electronics compartment 328 is defined by the partition 352. As illustrated in FIG. 17, the traction drive unit housing 320 includes the partition 352 that, with respect to the rotor shaft axis 262 of the traction drive unit 320, extends radially inboard from the inner surface 332 of the main body 330. As illustrated in FIG. 17, an electronics compartment end plate 362 is coupled to the partition 352 at an axial end of the traction drive unit housing 320 to define the electronics compartment 328 together with the partition 352. In the illustrated embodiment, the partition 352 extends between the electric brake housing region 326 and the electronics compartment 328 of the traction drive unit housing 320. In various implementations, the electronics compartment 328 of the traction drive unit housing 320 houses various electronic components of the traction drive unit 20. For example, as illustrated in FIG. 17, the traction drive unit 20 includes the in-line driver board 233 for controlling operation of the traction drive unit 20 and a plurality of wires 231 that are coupled with the in-line driver board 233 and extend out of the electronics compartment 328 to the robot to which the robotics corner module 10 is coupled. In various implementations, the portion of the traction drive unit housing 320 that defines the electronics compartment 328 defines an access opening 364 through which wires 231 disposed within the electronics compartment 328 may extend through to exit the electronics compartment 328 and extend within a wiring passage 229 defined by various components of the robotics corner module 10, as described further herein. As illustrated in FIGS. 17 and 22, the access opening 364 that is in communication with the electronics compartment 328 is disposed proximate a top side of the electronics compartment 328, in various implementations.

Referring now to FIGS. 16 and 17, the traction drive unit 20 of the robotics corner module 10 includes a wheel hub bearing 366. In various implementations, the wheel hub bearing 366 extends radially, with respect to the rotor shaft axis 262 of the traction drive unit 20, between the outer surface 334 of the main body 330 of the traction drive unit housing 320 and the wheel hub 300 of the wheel 254 of the traction drive unit 20. In various implementations, the traction drive unit 20 can include a plurality of wheel hub bearings 366. For example, as illustrated in FIG. 17, the traction drive unit 20 includes a pair of wheel hub bearings 366 that are axially offset from each other with respect to the rotor shaft axis 262 of the traction drive unit 20. The wheel hub bearing 366 is configured to support and facilitate rotation of the wheel hub 300 of the wheel 254 about the wheel hub axis 270.

In some implementations, the wheel hub bearing 366 is axially aligned with the electric motor 252 of the traction drive unit 20 with respect to the rotor shaft axis 262 of the traction drive unit 20. In various implementations, the one or more grooves 336 that are defined by the outer surface 334 of the main body 330 of the traction drive unit housing 320 are axially aligned with one or more of the wheel hub bearings 366 that extends circumferentially about the main body 330 of the traction drive unit housing 320. For example, as illustrated in FIG. 17, the main body 330 includes a plurality of grooves 336 that are axially aligned with the electric motor 252 of the traction drive unit 20. The traction drive unit 20 includes first and second wheel hub bearings 366 that are axially aligned with the grooves 336. The wheel hub bearings 366 extend over the grooves 336 as the wheel hub bearings 366 extend circumferentially along the adjacent portions of the outer surface 334 of the main body 330 of the traction drive unit housing 320. Axially aligning the electric motor 252, the grooves 336, and the one or more wheel hub bearings 366, as illustrated in FIG. 17, may advantageously encourage heat transfer from the electric motor 252 and/or the wheel hub bearings 366 to the conduits 338 of the cooling system 340 of the robotics corner module 10 that terminate within the grooves 336, as described further herein.

Referring now to FIGS. 1, 2, and 18-22, the robotics corner module 10 includes the intermediate assembly 30.

The intermediate assembly 30 extends between the steering drive unit 100 and the traction drive unit 20 and includes the support structure 250 and the cooling system 340. The support structure 250 is operably coupled to the output shaft 106 of the steering drive unit 100 as well as the traction drive unit 20, such that rotation of the output shaft 106 about the output shaft axis 50 drives rotation of the support structure 250 and the traction drive unit 20 about the output shaft axis 50 to control a steering angle of the robotics corner module 10. The support structure 250 may include a plurality of components, as described further herein. The cooling system 340 of the intermediate assembly 30 is coupled to the support structure 250. In various implementations, the cooling system 240 is configured to rotate with the support structure 250 as the output shaft 106 of the steering drive unit 100 rotates about the output shaft axis 50. The cooling system 340 includes a radiator 368 that is mounted to the support structure 250. In an exemplary embodiment, the radiator 368 is a finned tube radiator that includes a plurality of fins and is configured to convey coolant, such as a water glycol mixture, therethrough via convection. In the embodiment illustrated in FIGS. 19-21, the radiator 368 is a finned tube radiator that is configured to have air delivered over the finned portion of the radiator 368, such that heat is transferred from the coolant to the air via the fins. It is contemplated that the cooling system 340 of the intermediate assembly 30 can include a variety of types of radiators 368, in various implementations.

Referring now to FIGS. 2 and 18-21, the cooling system 240 includes the conduit 338. The conduit 338 extends outward from the radiator 368 and conveys coolant therein. In various embodiments, the conduit 338 extends radially between the wheel 254 of the traction drive unit 20 and the outer surface 334 of the main body 330 of the traction drive unit housing 320 along a portion of the outer surface 334 of the main body 330 that is axially aligned with the electric motor 252 of the traction drive unit 20. In various implementations, the conduit 338 extends radially between the wheel hub bearing 366 and the outer surface 334 of the traction drive unit 20 along a portion of the outer surface 334 of the main body 330 that is axially aligned with the electric motor 252 of the traction drive unit 20, with respect to the rotor shaft axis 262 of the traction drive unit 20. For example, in an exemplary implementation, wherein the outer surface 334 of the main body 330 of the traction drive unit housing 320 includes the groove 336 that is recessed in the radially-inboard direction, the conduit 338 of the cooling system 340 extends from the radiator 368 and radially between the wheel hub bearing 366 and the outer surface 334 of the main body 330 within the groove 336 defined by the outer surface 334 of the main body 330. As such, heat is transferred from the electric motor 252 of the traction drive unit 320 and/or the wheel hub bearing 366 of the traction drive unit 20 to the fluid (e.g., coolant) within the conduit 338, which is delivered to the radiator 368 via convection and cooled by air flow flowing over the radiator 368.

In some implementations, the cooling system 340 of the intermediate assembly 30 can include a plurality of conduits 338. For example, as illustrated in FIGS. 18-21, the cooling system 340 includes a plurality of conduits 338 that extend outward from the radiator 368 of the cooling system 340 to respective terminal ends 370 of the conduits 338. As illustrated in FIG. 21, the plurality of conduits 338 are received by a corresponding plurality of grooves 336 formed in the outer surface 334 of the main body 330 of the traction drive unit housing 320, and the respective terminal ends 370 of the conduits 338 are disposed within the corresponding grooves 336 of the outer surface 334 of the main body 330. In various implementations, the terminal end 370 of the conduit 338 of the cooling system 340 terminates within the groove 336 at an axial position that aligns with the axial position of the electric motor 252 of the traction drive unit 20, with respect to the rotor shaft axis 262 of the traction drive unit 20.

As illustrated exemplarily in FIG. 22, in various implementations, the conduit 338 of the cooling system 240 that extends outward from the radiator 368 extends through the opening 314 defined at the axial end 312 of the wheel hub 300 and into the wheel hub cavity 316. Having the one or more conduits 338 extend around the axial end 312 of the wheel hub 300 and into the wheel hub cavity 316 through the opening 314 in this manner may advantageously allow for the conduits 338 to extend along the outer surface 334 of the main body 330 of the traction drive unit 20 at a position that is axially aligned with the electric motor 252 for optimum heat transfer while ensuring that rotation of the wheel 254 is unimpeded by the one or more conduits 338.

Referring now to FIGS. 18-20 and 22, the cooling system 340 of the intermediate assembly 30 can include a fan 372. The fan 372 can be mounted to the support structure 250 and configured to deliver air to the radiator 368. In various implementations, the support structure 250 includes a duct 374 having an inlet 376 and an outlet 378, and the fan 372 is configured to deliver air through the duct 374 to the radiator 368 of the cooling system 340. As described further herein, in some implementations, a portion of the radiator 368 may be disposed within the outlet 378 of the duct 374 of the support structure 250 to support the radiator 368.

Figure 20:
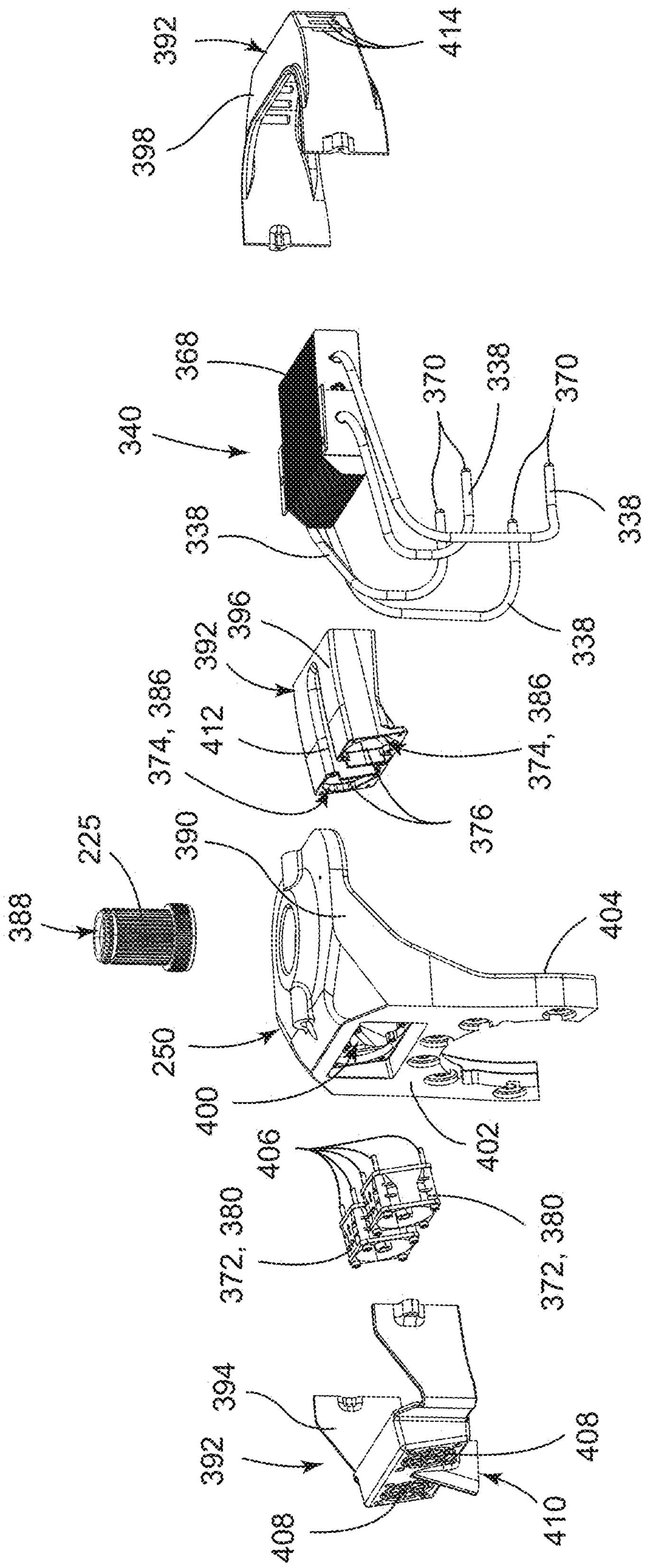
FIG. 20 is an exploded view of the intermediate assembly of the robotics corner module, according to one embodiment.

In some implementations, the cooling system 340 includes a plurality of fans 372. For example, as illustrated in FIG. 20, the cooling system 340 of the intermediate assembly 30 includes a first fan 380 and a second fan 382. In some embodiments, the support structure 250 can include a plurality of ducts 374 corresponding with the plurality of fans 372. For example, in the embodiment illustrated in FIG. 20, wherein the cooling system 340 includes the first fan 380 and the second fan 382, the support structure 250 of the intermediate assembly 30 can include a first duct 384 and a second duct 386 that correspond with the first and second fans 380, 382, respectively. As illustrated in FIG. 20, the first and second ducts 384, 386 include respective inlets 376. In some implementations, the first and second ducts 384, 386 share a common outlet 378. For example, the support structure 250 may include a first duct 384 that extends from an inlet 376 of the first duct 384 to an outlet 378 of the first duct 384, and the support structure 250 may include a second duct 386 that extends from an inlet 376 of the second duct 386 to the outlet 378 of the first duct 384 that serves as a shared outlet 378 for the first and second ducts 384, 386.

In operation of the cooling system 340 of the intermediate assembly 30 of the robotic corner module 10, heat is transferred from the electric motor 252 and/or various other components of the traction drive unit 20 to fluid disposed within the conduits 338 of the cooling system 340 that extend outward from the radiator 368. The one or more fans 372 of the cooling system 340 then deliver air to the radiator 368, which prompts heat to transfer from the fluid to the air, such that the traction drive unit 20 may be maintained at an operational temperature during operation of the robotics corner module 10.

Referring now to FIGS. 1, 2, 18-20, and 22, the support structure 250 of the intermediate assembly 30 includes the connecting shaft 225. The connecting shaft 225 is engaged with the output shaft 106 of the steering drive unit 100. As illustrated in FIG. 22, the connecting shaft 225 defines a connecting shaft hollow 388, which may form a portion of the wiring passage 229, as described further herein. The support structure 250 can include the support arm 390. The support arm 390 can be engaged with the connecting shaft 225 and mounted to the traction drive unit housing 320, as illustrated in FIG. 1. In various implementations, the support arm 390 of the support structure 250 of the intermediate assembly 30 is mounted to the main body 330 of the traction drive unit housing 320 via a plurality of fasteners 406, such as bolts.

Referring still to FIGS. 1, 2, 18-20, and 22, the support structure 250 can include a cooling system housing 392. The cooling system housing 392 may be coupled to the support arm 390 and configured to house various components of the cooling system 340 of the intermediate assembly 30. In the embodiment illustrated in FIG. 20, the cooling system housing 392 includes a fan housing 394 that is configured to house the first and second fans 380, 382 of the cooling system 340, a manifold 396 that includes the first and second ducts 384, 386 of the support structure 250, and a radiator housing 398 that cooperates with the manifold 396 to support the radiator 368. As illustrated in FIG. 20, the support arm 390 of the support structure 250 defines a passthrough opening 400 that extends from a first side 402 of the support arm 390 to a second side 404 of the support arm 390 opposite the first side 402. The first and second fans 380, 382 of the cooling system 340 are configured to be partially received within the passthrough opening 400 defined by the support arm 390 at the first side 402 of the support arm 390. The fan housing 394 is configured to be mounted to the support arm 390 and cooperate with the passthrough opening 400 defined by the support arm 390 to house the first and second fans 380, 382. In some embodiments, fasteners 406 may extend through the fan housing 394, the first and second fans 380, 382, and a portion of the support arm 390 to secure the first and second fans 380, 382, fan housing 394, and support arm 390 to each other in the assembled condition of the intermediate assembly 30.

Figure 18:
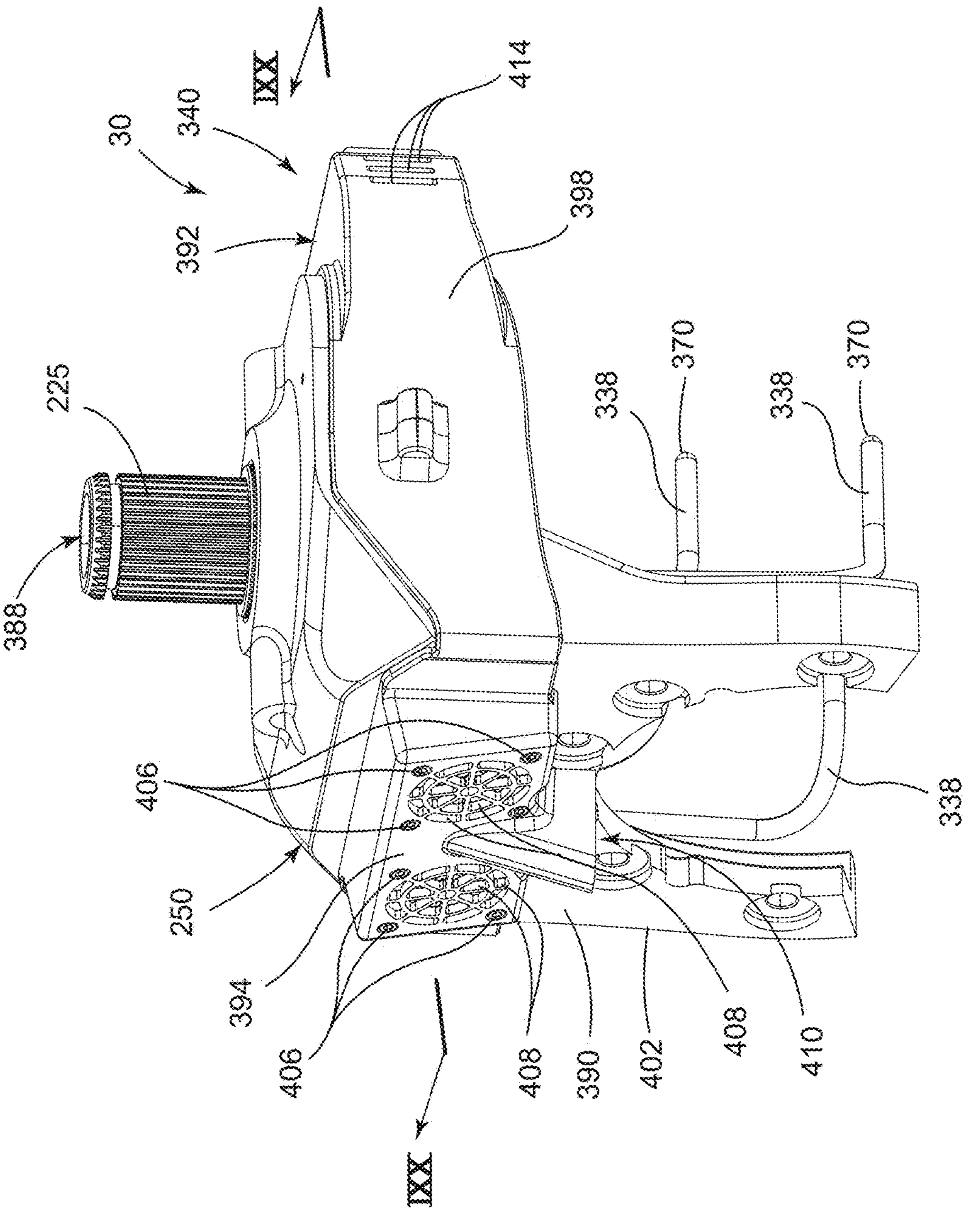
FIG. 18 is a perspective view of an intermediate assembly of the robotics corner module illustrated in FIG. 2, according to one embodiment.
Figure 19:
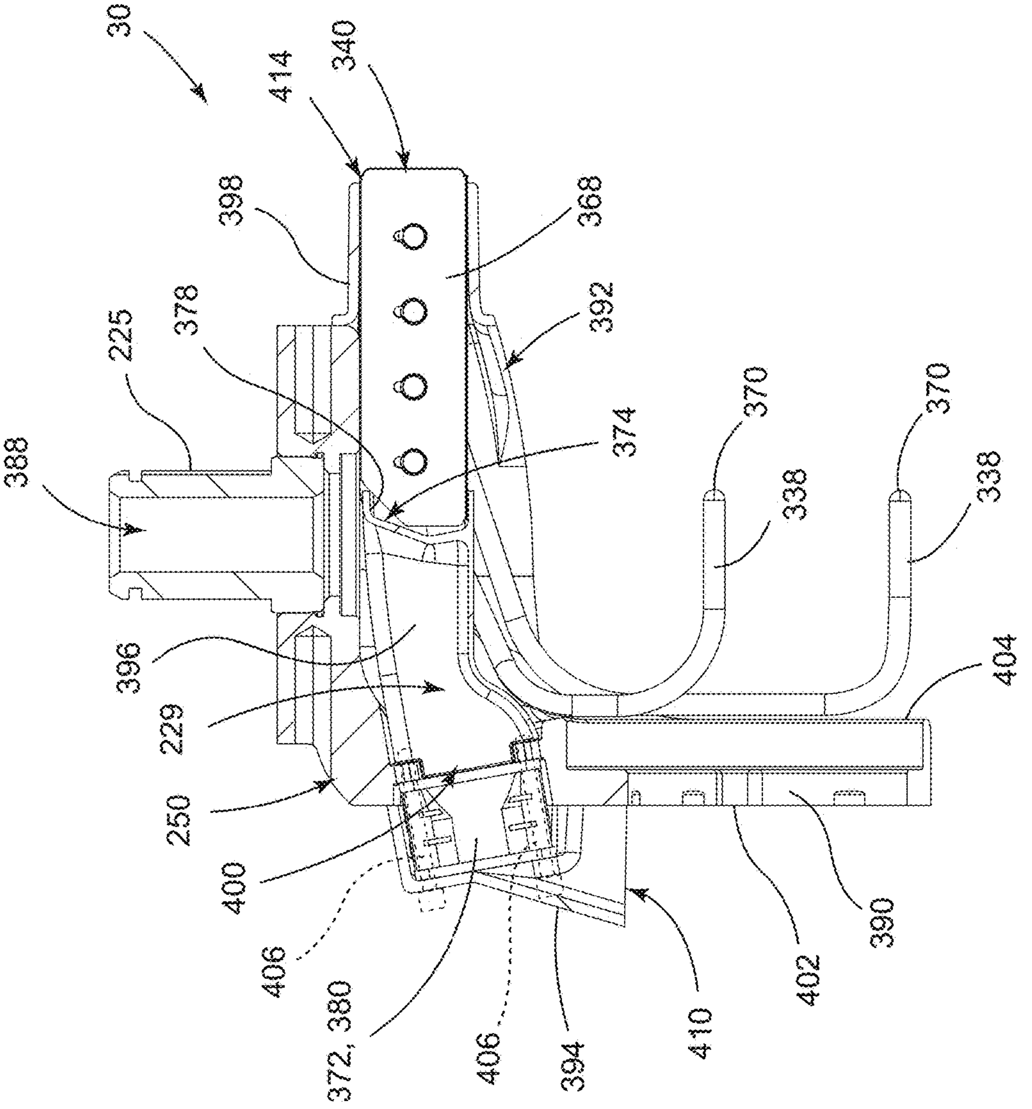
FIG. 19 is a cross-sectional view of the intermediate assembly of FIG. 18, according to one embodiment.

As illustrated in FIG. 18, in various implementations, the radiator housing 398 is mounted to the fan housing 394, such that the portion of the fan housing 394 that houses the fan 372 generally faces the first side 402 of the support arm 390 and the portion of the radiator housing 398 that houses the radiator 368 generally faces the second side 404 of the support arm 390. As illustrated in FIG. 18, the fan housing 394 includes a plurality of vent openings 408 that allow air to be drawn through the fan housing 394 by the first and second fans 380, 382 before being delivered to the radiator 368 of the cooling system 340, subsequently. As illustrated in FIGS. 19 and 22, the fan housing 394 may define an opening 410 that corresponds with the access opening 364 defined by the traction drive unit housing 320, such that the electronics compartment 328 defined by the traction drive unit housing 320 is in fluid communication with the wiring passage 229 via the opening 410 of the fan housing 394 and the corresponding access opening 364 of the traction drive unit housing 320.

The cooling system housing 392 of the support structure 250 can include the manifold 396. The manifold 396 may include a plurality of ducts 374, and the plurality of ducts 374 may include a common outlet 378. As illustrated in FIGS. 19 and 20, the manifold 396 includes the first duct 384 and the second duct 386 that include respective inlets 376 and share a common outlet 378. As illustrated in FIG. 19, a portion of the radiator 368 of the cooling system 340 is disposed within the common outlet 378 of the first and second ducts 384, 386 of the manifold 396, such that the manifold 396 cooperates with the radiator housing 398 to support the radiator 368. In some implementations, the fasteners 406 that couple the fan housing 394, one or more fans 372, and the support arm 390 of the support structure 250 also extend into and fasten the manifold 396 to the second side 404 of the support arm 390 of the support structure 250. In various implementations, the wiring passage 229 of the robotics corner module 10 through which wires 231 extend from traction drive unit 20 to steering drive unit 100 is defined by the manifold 396 of the cooling system housing 392 between the first and second ducts 384, 386. A passage portion 412 of the manifold 396 that is between the first and second ducts 384, 386 and defines a portion of the wiring passage 229 of the robotics corner module 10 is illustrated in FIG. 20 and shown in the cross-sectional view illustrated in FIG. 19.

Referring now to FIGS. 18-20 and 22, the radiator housing 398 of the cooling system housing 392 may be mounted to the fan housing 394 of the cooling system housing 392 and configured to house the radiator 368 of the cooling system 340. In various implementations, the radiator housing 398 cooperates with the manifold 396 to house the radiator 368 by axially sandwiching the radiator 368 therebetween, with respect to the rotor shaft axis 262 of the traction drive unit 20, and supporting the radiator 368 from beneath. As illustrated in FIG. 18, the radiator housing 398 may include a plurality of airflow apertures 414 that expose the radiator 368 to an external environment of the cooling system housing 392 to allow for efficient heat transfer from the fluid within the radiator 368 to the air.

Referring now to FIG. 22, the robotics corner module 10 includes the wiring passage 229 that extends from the traction drive unit 20, through the intermediate assembly 30, and to the steering drive unit 100. The wiring passage 229 is configured to receive wires 231 that are extending from the electronics compartment 328 of the traction drive unit 20 to the robot to which the robotics corner module 10 is coupled. In the embodiment illustrated in FIG. 22, the access opening 364 defined by the traction drive unit housing 320 that is in communication with the electronics compartment 328 of the traction drive unit housing 320 corresponds with the opening 410 defined by the fan housing 394 of the support structure 250. The wiring passage 229 is defined therefrom, initially, by the fan housing 394 and extends to the passthrough opening 400 of the support arm 390. The passage portion 412 of the manifold 396 of the support structure 250 that is disposed between the first and second ducts 384, 386 is adjacent to the passthrough opening 400 of the support arm 390 on the second side 404 of the support arm 390 and defines the next portion of the wiring passage 229. As the wiring passage 229 extends further toward the steering drive unit 100, it is defined by the support arm 390 and then the connecting shaft 225 that includes the hollow 388. The hollow 388 of the connecting shaft 225 is in communication with the hollow 227 of the output shaft 106, such that the wiring passage 229 extends through the steering drive unit 100 and onward to the robot, to which the robotics corner module 10 is mounted. As such, the fan housing 394, manifold 396, support arm 390, and connecting shaft 225 of the support structure 250 of the intermediate assembly 30 can cooperate to define the wiring passage 229. As illustrated in FIG. 22, wires 231 connected to the in-line driver board 233 of the traction drive unit 20 extend from the electronics compartment 328 defined by the traction drive unit housing 320 through the support structure 250 of the intermediate assembly 30 and into the steering drive unit 100 via the wiring passage 229.

It is to be understood that variations and modifications can be made on the aforementioned structure without departing from the concepts of the present disclosure, and further it is to be understood that such concepts are intended to be covered by the following claims unless these claims by their language expressly state otherwise.

LIST OF REFERENCE NUMERALS

10 Robotics corner module
20 Traction drive unit
30 Intermediate assembly
40 Rotor shaft axis (of the steering drive unit)
50 Output shaft axis
100 Steering drive unit
102 Lower housing assembly
104 Center housing assembly
106 Output shaft
108 Shaft assembly (first)
110 Compound gear assembly
112 First electric motor
114 Geartrain (steering drive unit)
116 Fastener (first, center housing to shaft portion)
117 Fastener (center housing to lower housing)
118 Lower housing
120 Through bore (first, lower housing)
122 Through bore (second, lower housing)
124 Counterbore (first, lower housing)
126 Shaft portion (lower housing)
128 Center housing
130 Through bore (third, center housing)
132 Through bore (fourth, center housing)
134 Through bore (fifth, center housing)
136 Stator assembly (electric motor)
138 Rotor assembly (electric motor)
140 First Rotor shaft
142 Thermocouple
144 Busbar board
146 Output gear
148 Shaft portion (output shaft)
150 Shaft (first)
152 Gear (first)
154 Gear portion (first, compound gear assembly)
156 Gear portion (second, compound gear assembly)
158 Bushing
160 Needle bearing (first)
161 Hardened race (shaft assembly)
162 Ball bearing (first)
164 Bearing housing assembly
166 Bearing housing
168 Through bore (sixth, bearing housing)
170 Needle bearing (bearing housing)
171 Hardened race (shaft assembly)
172 Fasteners (bearing housing to lower housing)
174 Access holes (center housing)
176 Ball bearing (second, compound gear assembly)
178 Needle bearing (third, compound gear assembly)
179 Hardened sleeve
180 Cylindrical protrusion (center housing)
182 O-ring (center housing assembly)
184 Gear (second)
185 Bearing puller windows (second gear)
186 Fastener (second, second gear to first shaft)
188 Upper housing assembly
190 Upper housing
192 Fasteners (upper housing to lower housing)
193 Housing vent
194 Shaft (second, center housing)
196 Idler gear assembly
198 Idler gear
200 Needle bearing (idler gear)
202 Pinion gear (rotor shaft)
204 Rotor laminations with bonded permanent magnets
206 Bearing (rotor assembly)
208 Bearing (rotor assembly)
210 Magnet housing (rotor assembly)
212 Magnet (rotor assembly)
214 Through bore (seventh, upper housing)
216 Ball bearing (upper housing)
218 Bearing nut
220 Seal (upper housing assembly)
222 Encoder target
224 Internal spline portion (output shaft)
225 Connecting shaft (intermediate assembly)
226 Ring groove (output shaft)
227 Hollow (defined by output shaft)
228 Wave spring
229 Wiring passage
230 Driver board housing
231 Eires
233 In-line driver board (of traction drive unit)
236 Driver board (of the steering drive unit)
250 Support structure
252 Electric motor (of traction drive unit)
254 Wheel
256 Stator (of traction drive unit)
258 Rotor (of traction drive unit)
260 Rotor shaft (of traction drive unit)
262 Rotor shaft axis (of traction drive unit)
264 Geartrain (of traction drive unit)
266 Gear sets
268 Planetary gearsets
270 Wheel axis
272 Sun gear
274 First planetary gearset
276 Sun gear (of first planetary gearset)
278 Planet gears (of first planetary gearset)
280 Carrier (of first planetary gearset)
282 Second planetary gearset
284 Sun gear (of second planetary gearset)
286 Planet gears (of second planetary gearset)
288 Carrier (of second planetary gearset)
290 Bushing (of geartrain of traction drive unit)
292 Ring gear (of geartrain of traction drive unit)
294 Axially distal face (of the carrier)
296 Spline interface (of axially distal face)
298 Corresponding spline interface (of wheel hub)
300 Wheel hub
302 Cap portion (of wheel hub)
304 Base (of cap portion)
306 Sidewall (of cap portion)
308 Rim (of cap portion)
310 Ring-shaped portion (of wheel hub)
312 End/axial end (of the wheel hub)
314 Opening (to wheel hub hollow/cavity)
316 Wheel hub hollow/wheel hub cavity
318 Wheel rim
320 Traction drive unit housing
322 Motor housing region
324 Gearbox region
326 Electric brake housing region
328 Electronics compartment
330 Main body
332 Inner surface (of main body)

334 Outer surface (of main body)
336 Groove (in main body)
338 Conduits
340 Cooling system
342 Bearing shield (of traction drive unit housing)
344 Bearing
346 Gearbox end plate
348 Gearbox end plate opening
350 Bearing shield (of traction drive unit housing)
352 Partition
354 Bearing
356 Electric brake
358 Brake coil
360 Brake armature
362 Electronics compartment end plate
364 Access opening
366 Wheel hub bearing
368 Radiator
370 Terminal end
372 Fan
374 Duct
376 Inlet
378 Outlet
380 First fan
382 Second fan
384 First duct
386 Second duct
388 Connecting shaft hollow
390 Support arm
392 Cooling system housing
394 Fan housing
396 Manifold
398 Radiator housing
400 Passthrough opening (of support arm)
402 First side (of support arm)
404 Second side (of support arm)
406 Fasteners (of intermediate assembly)
408 Vent openings
410 Opening (of fan housing corresponding with access opening)
412 Passage portion (of manifold)
414 Airflow apertures

What is claimed is:

1. A robotics corner module, comprising:

a steering drive unit, comprising:

an electric motor that drives rotation of a rotor shaft about a rotor shaft axis; and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis;

a traction drive unit, comprising:

an electric motor that drives rotation of a rotor shaft about a rotor shaft axis; and a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit; and a support structure that extends between the output shaft and the traction drive unit, such that rotation of the output shaft about the output shaft axis drives rotation of the support structure and the traction drive unit about the output shaft axis, wherein the geartrain of the traction drive unit includes a first planetary gearset, comprising:

a sun gear that is coupled to the rotor shaft of the traction drive unit, such that the sun gear and the rotor shaft of the traction drive unit are operable to rotate about the rotor shaft axis of the traction drive unit at a common rate of rotation;

a plurality of planet gears engaged with the sun gear and configured to revolve about the rotor shaft axis of the traction drive unit; and a carrier that rotates about the rotor shaft axis of the traction drive unit at a rate corresponding with a rate that the planet gears revolve about the rotor shaft axis of the traction drive unit.

2. The robotics corner module of claim 1, wherein the geartrain of the traction drive unit includes a second planetary gearset, comprising:

a sun gear that is coupled to the carrier of the first planetary gearset and configured to rotate at a common rate of rotation about the rotor shaft axis of the traction drive unit with the carrier of the first planetary gearset;

a plurality of planet gears engaged with the sun gear of the second planetary gearset and configured to revolve about the rotor shaft axis of the traction drive unit; and a carrier that rotates about the rotor shaft axis of the traction drive unit at a rate corresponding with a rate that the planet gears of the second planetary gearset revolve about the rotor shaft axis of the traction drive unit, wherein the carrier of the second planetary gearset is operably coupled with the wheel hub, such that the wheel hub and the carrier of the second planetary gearset rotate at a common rate of rotation.

3. The robotics corner module of claim 2, wherein the geartrain of the traction drive unit includes a ring gear that, with respect to the rotor shaft axis of the traction drive unit, is rotationally fixed and is radially outboard of and engaged with the plurality of planet gears of the first planetary gearset and the plurality of planet gears of the second planetary gearset.

4. The robotics corner module of claim 3, wherein the carrier of the second planetary gearset includes an axially distal face that faces axially away from the electric motor of the traction drive unit with respect to the rotor shaft axis of the traction drive unit, the axially distal face having a spline interface that is engaged with a corresponding spline interface of the wheel hub that faces axially toward the electric motor of the traction drive unit.

5. The robotics corner module of claim 4, wherein the traction drive unit further comprises:

a traction drive unit housing that includes a main body that has an inner surface that defines a motor housing region that houses the electric motor of the traction drive unit and an outer surface opposite the inner surface; and a wheel hub bearing that extends radially, with respect to the rotor shaft axis of the traction drive unit, between the outer surface of the main body of the traction drive unit housing and the wheel hub and that is configured to support and facilitate rotation of the wheel hub about the wheel hub axis, wherein the wheel hub bearing is axially aligned with the electric motor of the traction drive unit with respect to the rotor shaft axis of the traction drive unit.

6. The robotics corner module of claim 5, wherein the traction drive unit further comprises:

a wheel rim that, with respect to the rotor shaft axis of the traction drive unit, extends radially outboard from the wheel hub and is axially aligned with the wheel hub bearing.

7. The robotics corner module of claim 6, wherein the main body of the traction drive unit housing further defines a gearbox region that houses the geartrain of the traction drive unit on a first axial side of the motor housing region with respect to the rotor shaft axis of the traction drive unit.

8. The robotics corner module of claim 7, wherein the traction drive unit housing comprises:

a bearing shield that, with respect to the rotor shaft axis of the traction drive unit, extends radially inboard from the inner surface of the main body between the motor housing region and the gearbox region; and a gearbox end plate that, with respect to the rotor shaft axis of the traction drive unit, extends radially inboard from the inner surface of the main body toward the carrier of the second planetary gearset, such that the inner surface of the main body, the bearing shield, and the gearbox end plate cooperate to define the gearbox region of the housing, wherein the carrier of the second planetary gearset extends through a gearbox end plate opening defined by the gearbox end plate, such that the axially distal face of the carrier is positioned axially beyond the gearbox end plate outside of the gearbox region of the housing.

9. The robotics corner module of claim 7, wherein the traction drive unit further comprises:

an electric brake configured to inhibit rotational movement of the rotor shaft of the traction drive unit about the rotor shaft axis of the traction drive unit.

10. The robotics corner module of claim 9, wherein the traction drive unit housing comprises:

a bearing shield that, with respect to the rotor shaft axis, extends radially inboard from the inner surface of the main body between the motor housing region and an electric brake housing region that is defined by the main body and the bearing shield that extends between the motor housing region and the electric brake housing region, wherein the motor housing region is positioned axially between the gearbox region and the electric brake housing region.

11. The robotics corner module of claim 10, wherein the traction drive unit housing comprises:

a partition that, with respect to the rotor shaft axis of the traction drive unit, extends radially inboard from the inner surface of the main body, such that the main body, the bearing shield that extends between the motor housing region and the electric brake housing region, and the partition cooperate to define the electric brake housing region, wherein the partition further defines an electronics compartment that houses an in-line driver board for controlling the electric motor of the traction drive unit, the electronics compartment being positioned, such that the electric brake housing region is positioned axially between the electronics compartment and the motor housing region.

12. The robotics corner module of claim 5, wherein the outer surface of the main body includes a groove that, with respect the rotor shaft axis of the traction drive unit, is recessed in the radially-inboard direction and axially aligned with the electric motor of the traction drive unit.

13. The robotics corner module of claim 12, further comprising:

a radiator mounted to the support structure and having a conduit extending outward therefrom and into the groove of the outer surface, such that a portion of the conduit is axially aligned with the motor and positioned radially between the wheel hub bearing and the main body, with respect to the rotor shaft axis of the traction drive unit.

14. The robotics corner module of claim 13, wherein the conduit includes a terminal end that is disposed within the groove of the outer surface of the main body.

15. A robotics corner module, comprising:

a steering drive unit, comprising:

an electric motor that drives rotation of a rotor shaft about a rotor shaft axis; and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis;

a traction drive unit, comprising:

an electric motor that drives rotation of a rotor shaft about a rotor shaft axis;

a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit;

a traction drive unit housing that includes a main body that has an inner surface that defines a motor housing region that houses the electric motor of the traction drive unit and an outer surface opposite the inner surface; and a wheel hub bearing that extends radially, with respect to the rotor shaft axis of the traction drive unit, between the outer surface of the main body of the traction drive unit housing and the wheel hub and is configured to support and facilitate rotation of the wheel hub about the wheel hub axis, wherein the wheel hub bearing is axially aligned with the electric motor of the traction drive unit with respect to the rotor shaft axis of the traction drive unit; and a support structure that extends between the output shaft and the traction drive unit, such that rotation of the output shaft about the output shaft axis drives rotation of the support structure and the traction drive unit about the output shaft axis.

16. The robotics corner module of claim 15, wherein the traction drive unit further comprises:

a wheel rim that, with reference to the rotor shaft axis of the traction drive unit, extends radially outboard from the wheel hub and is axially aligned with the wheel hub bearing.

17. The robotics corner module of claim 16, wherein the outer surface of the main body includes a groove that, with respect the rotor shaft axis of the traction drive unit, is recessed in the radially-inboard direction and axially aligned with the electric motor of the traction drive unit.

18. The robotics corner module of claim 17, further comprising:

a radiator mounted to the support structure and having a conduit extending outward therefrom and into the groove of the outer surface, such that a portion of the conduit, with respect to the rotor shaft axis of the traction drive unit, is axially aligned with the electric motor of the traction drive unit and positioned radially between the wheel hub bearing and the main body.

19. A robotics corner module, comprising:

a steering drive unit, comprising:

an electric motor that drives rotation of a rotor shaft about a rotor shaft axis; and an output shaft operably coupled with the rotor shaft via a geartrain, such that rotation of the rotor shaft about the rotor shaft axis by the electric motor drives rotation of the output shaft about an output shaft axis that is parallel to and radially offset from the rotor shaft axis;

a traction drive unit, comprising:

an electric motor that drives rotation of a rotor shaft about a rotor shaft axis; and a wheel hub operably coupled with the rotor shaft of the traction drive unit via a geartrain, such that rotation of the rotor shaft of the traction drive unit drives rotation of the wheel hub about a wheel hub axis that is parallel to and radially aligned with the rotor shaft axis of the traction drive unit;

a support structure that extends between the output shaft and the traction drive unit, such that rotation of the output shaft about the output shaft axis drives rotation of the support structure and the traction drive unit about the output shaft axis; and a radiator mounted to the support structure.

* * * * *